United States Patent
Kulkarni et al.

(10) Patent No.: US 12,541,472 B2
(45) Date of Patent: Feb. 3, 2026

(54) NAMESPACE MANAGEMENT USING MASTERSHIP IN MULTI-HOST STORAGE SYSTEMS

(71) Applicant: Western Digital Technologies, Inc., San Jose, CA (US)

(72) Inventors: Swarup Kulkarni, Bangalore (IN); Dinesh Babu, Bangalore (IN); Pavan Gururaj, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 139 days.

(21) Appl. No.: 18/493,043

(22) Filed: Oct. 24, 2023

(65) Prior Publication Data

US 2025/0130960 A1 Apr. 24, 2025

(51) Int. Cl.
G06F 13/16 (2006.01)
G06F 12/02 (2006.01)

(52) U.S. Cl.
CPC ...... G06F 13/1668 (2013.01); G06F 12/0238 (2013.01)

(58) Field of Classification Search
CPC .................. G06F 13/1668; G06F 12/0238
USPC ........................................... 710/105
See application file for complete search history.

(56) References Cited

U.S. PATENT DOCUMENTS

| | | | |
|---|---|---|---|
| 8,484,242 B1 | 7/2013 | Singh | |
| 9,558,112 B1 | 1/2017 | Borchers | |
| 9,772,787 B2 | 9/2017 | Oikarinen | |
| 9,785,356 B2 | 10/2017 | Huang | |
| 9,971,526 B1 | 5/2018 | Wei | |
| 10,768,820 B2 | 9/2020 | Subramanian | |
| 11,734,429 B1* | 8/2023 | Shanmugam | G06F 21/575 713/2 |
| 2007/0292563 A1* | 12/2007 | Kappelman | A21D 2/16 426/20 |
| 2009/0070560 A1 | 3/2009 | Meng | |
| 2018/0088811 A1* | 3/2018 | Kanno | G06F 3/0604 |
| 2018/0121344 A1* | 5/2018 | Seo | G06F 12/0246 |
| 2018/0364917 A1 | 12/2018 | Ki | |
| 2019/0121543 A1* | 4/2019 | Frolikov | G06F 3/0664 |
| 2019/0121548 A1* | 4/2019 | Frolikov | G06F 3/0608 |
| 2019/0129862 A1* | 5/2019 | Yoshida | G06F 12/1009 |
| 2019/0146907 A1* | 5/2019 | Frolikov | G06F 12/0246 711/103 |
| 2019/0146931 A1* | 5/2019 | Frolikov | G06F 12/0246 713/193 |
| 2019/0180546 A1 | 6/2019 | Tsujimura | |
| 2019/0303610 A1 | 10/2019 | Bodegas Martinez | |
| 2020/0065198 A1 | 2/2020 | Reed | |
| 2021/0126909 A1 | 4/2021 | Iyer | |
| 2021/0349849 A1 | 11/2021 | Haberkorn | |
| 2022/0237309 A1 | 7/2022 | Reineke | |

(Continued)

*Primary Examiner* — Christopher B Shin
(74) *Attorney, Agent, or Firm* — Patent Law Works LLP

(57) ABSTRACT

Systems, methods, and storage interface controllers for namespace management using mastership in multi-host storage systems are described. The storage interface controllers, such as NVMeOF controllers, determine the set of host systems connected to a namespace and indicate one of them has having mastership. Only the host system with mastership may delete the namespace and delete commands from other host systems are rejected. Logic for determining and migrating mastership is also described.

20 Claims, 8 Drawing Sheets

(56) References Cited

U.S. PATENT DOCUMENTS

| | | |
|---|---|---|
| 2023/0026780 A1 | 1/2023 | Liangsheng |
| 2024/0020267 A1* | 1/2024 | Liu .................... G06F 16/2365 |
| 2024/0191891 A1* | 6/2024 | Abizeid ............ B01D 46/0036 |
| 2025/0004940 A1 | 1/2025 | Gururaj |

* cited by examiner

NAMESPACE MANAGEMENT USING MASTERSHIP IN MULTI-HOST STORAGE SYSTEMS

TECHNICAL FIELD

The present disclosure generally relates to storage systems supporting a plurality of hosts and, more particularly, to using storage interface controllers to manage namespace conflicts among hosts.

BACKGROUND

Non-Volatile Memory Express over Fabric (NVMe-oF) is a protocol that allows for the transfer of data between a host and a storage device over a network, such as Ethernet, Fibre Channel, or InfiniBand. This protocol is designed to leverage the benefits of NVMe, a storage protocol designed for flash, next-generation solid-state drives (SSDs), and other data storage devices, across network fabrics.

In multi-host storage systems, multiple hosts can access the same storage device. This can lead to issues with data consistency and integrity, especially when it comes to the deletion of namespaces. A namespace is a container for data stored in NVMe data storage devices, and it can be shared among multiple hosts. However, if one host deletes a namespace, it can disrupt the operations of other hosts that are using the same namespace.

Current solutions for managing namespace deletion in multi-host storage systems are not without their limitations. For instance, some solutions require manual intervention or configuration of host access privileges to prevent undesired namespace deletion, which can be time-consuming and prone to human error. Other solutions may not provide sufficient protection against data loss due to undesired namespace deletion.

Therefore, there is a demand for a more efficient and reliable method for managing namespaces in multi-host storage systems, particularly in terms of namespace deletion on systems supporting a large number of hosts and namespaces.

SUMMARY

Various aspects for namespace management using mastership for multi-host namespaces in storage systems are described. More particularly, storage interface controllers may maintain namespace metadata indicating which host system has mastership for each namespace and include automated logic for selecting and migrating mastership based on connection requests and timeout conditions.

One general aspect includes a storage system that includes a first storage interface controller that includes: a host interface configured to receive host storage commands from a plurality of host systems; a storage device interface configured to direct host storage commands to at least one namespace in at least one data storage device; a memory; and a processor. The processor is configured to: determine, for the at least one namespace, a set of host systems connected to the at least one namespace; determine, for the set of host systems, a mastership indicator based on a host identifier for one host system of the set of host systems; and selectively process a namespace delete command responsive to a received host identifier corresponding to the namespace delete command matching the host identifier with the mastership indicator.

Implementations may include one or more of the following features. The processor may be further configured to selectively reject the namespace delete command responsive to the received host identifier corresponding to the namespace delete command being different than the host identifier with the mastership indicator. The storage system may further include a data structure, stored in the memory, configured to map namespace identifiers for a plurality of namespaces to host identifiers for host systems connected to each namespace of the plurality of namespaces, where: the plurality of namespaces includes the at least one namespace; and the data structure may include, for each namespace, a namespace identifier for that namespace, a set of host identifiers connected to that namespace, and a mastership indicator for one host identifier in that set of host identifiers. Each namespace of the plurality of namespaces may correspond to a namespace entry indexed by the namespace identifier for that namespace, the data structure may be further configured to order the set of host identifiers in each namespace entry in an order in which corresponding host systems connected to that namespace, and a position in the order may be the mastership indicator. The processor may be further configured to: determine that a first host system corresponding to the mastership indicator is not connected to the host interface; remove, responsive to determining that the first host system is not connected to the host interface, the host identifier for the first host system from the corresponding namespace entry; and select a next host identifier in the order for the mastership indicator. The processor may be further configured to: receive, from a first host system of the plurality of host systems, a first connection request for a first namespace; create, responsive to the first connection request, the first namespace by allocating a namespace in the at least one data storage device to a first namespace identifier for the first namespace; connect the first host system to the first namespace; and assign the mastership indicator for the first namespace to a first host identifier for the first host system. The processor may be further configured to: receive, subsequent to the first connection request and from a second host system of the plurality of host systems, a second connection request for the first namespace; connect the second host system to the first namespace; and associate a second host identifier for the second host system with the first namespace without the mastership indicator. The processor may be further configured to: determine a timeout condition for the first host system; and migrate, responsive to the timeout condition for the first host system, the mastership indicator from the first host identifier to the second host identifier. The storage system may include a second storage interface controller configured to: communicate with the plurality of host systems to receive host storage commands for the at least one namespace; communicate with the at least one data storage device to direct host storage commands for the at least one namespace; and synchronize, with the first storage interface controller, a set of metadata indicating host identifiers connected to the at least one namespace and the mastership indicator. The first storage interface controller and the second storage interface controller may be connected to a control bus; and the processor may be further configured to update the set of metadata and send the set of metadata to the second storage interface controller using a control bus protocol.

Another general aspect includes a computer-implemented method that includes: determining, for at least one namespace in at least one data storage device, a set of host systems connected to the at least one namespace; determining, for the set of host systems, a mastership indicator based on a host identifier for one host system of the set of host systems; selectively processing a namespace delete command responsive to a received host identifier corresponding to the namespace delete command matching the host identifier with the mastership indicator; and selectively rejecting the namespace delete command responsive to the received host identifier corresponding to the namespace delete command being different than the host identifier with the mastership indicator.

Implementations may include one or more of the following features. The computer-implemented method may include mapping, in a data structure, namespace identifiers for a plurality of namespaces to host identifiers for host systems connected to each namespace of the plurality of namespaces, where: the plurality of namespaces includes the at least one namespace; and the data structure may include, for each namespace, a namespace identifier for that namespace, a set of host identifiers connected to that namespace, and a mastership indicator for one host identifier in that set of host identifiers. The computer-implemented method may include ordering, in the data structure, the set of host identifiers in each namespace entry in an order in which corresponding host systems connected to that namespace, where: each namespace of the plurality of namespaces corresponds to a namespace entry indexed by the namespace identifier for that namespace; and a position in the order is the mastership indicator. The computer-implemented method may include: determining that a first host system corresponding to the mastership indicator is not connected to the host interface; removing, responsive to determining that the first host system is not connected to the host interface, the host identifier for the first host system from the corresponding namespace entry; and selecting a next host identifier in the order for the mastership indicator. The computer-implemented method may include: receiving, from a first host system of a plurality of host systems, a first connection request for a first namespace; creating, responsive to the first connection request, the first namespace by allocating a namespace in the at least one data storage device to a first namespace identifier for the first namespace; connecting the first host system to the first namespace; and assigning the mastership indicator for the first namespace to a first host identifier for the first host system. The computer-implemented method may include: receiving, subsequent to the first connection request and from a second host system of the plurality of host systems, a second connection request for the first namespace; connecting the second host system to the first namespace; and associating a second host identifier for the second host system with the first namespace without the mastership indicator. The computer-implemented method may include: determining a timeout condition for the first host system; and migrating, responsive to the timeout condition for the first host system, the mastership indicator from the first host identifier to the second host identifier. The computer-implemented method may include synchronizing, between a first storage interface controller and a second storage interface controller, a set of metadata, where: the set of metadata indicates host identifiers connected to the at least one namespace and the mastership indicator; and the first storage interface controller and the second storage interface controller are configured to communicate with a plurality of host devices to receive host storage commands for the at least one namespace, communicate with the at least one data storage device to direct host storage commands for the at least one namespace, and use the set of metadata to compare the received host identifier corresponding to the namespace delete command to the host identifier with the mastership indicator. The computer-implemented method may include: updating, by the first storage interface controller and responsive to a connection request from a host system, the set of metadata; and sending the set of metadata to the second storage interface controller using a control bus protocol, where the first storage interface controller and the second storage interface controller are connected to a control bus.

Still another general aspect includes a storage system that includes: a processor; a memory; a host interface configured to receive host storage commands from a plurality of host systems; a storage device interface configured to direct host storage commands to at least one namespace in at least one data storage device; means for determining, for at least one namespace, a set of host systems connected to the at least one namespace; means for determining, for the set of host systems, a mastership indicator based on a host identifier for one host system of the set of host systems; means for selectively processing a namespace delete command responsive to a received host identifier corresponding to the namespace delete command matching the host identifier with the mastership indicator; and means for selectively rejecting the namespace delete command responsive to the received host identifier corresponding to the namespace delete command being different than the host identifier with the mastership indicator.

The various embodiments advantageously apply the teachings of data storage devices and/or multi-device storage systems to improve the functionality of such computer systems. The various embodiments include operations to overcome or at least reduce the issues previously encountered in storage arrays and/or systems and, accordingly, are more reliable and/or efficient than other computing systems. That is, the various embodiments disclosed herein include hardware and/or software with functionality to improve shared access to non-volatile memory resources by host systems in multi-tenant storage systems, such as by using automated mastership determinations at the storage interface controller to control namespace delete operations. Accordingly, the embodiments disclosed herein provide various improvements to storage networks and/or storage systems.

It should be understood that language used in the present disclosure has been principally selected for readability and instructional purposes, and not to limit the scope of the subject matter disclosed herein.

DETAILED DESCRIPTION

Figure 1:
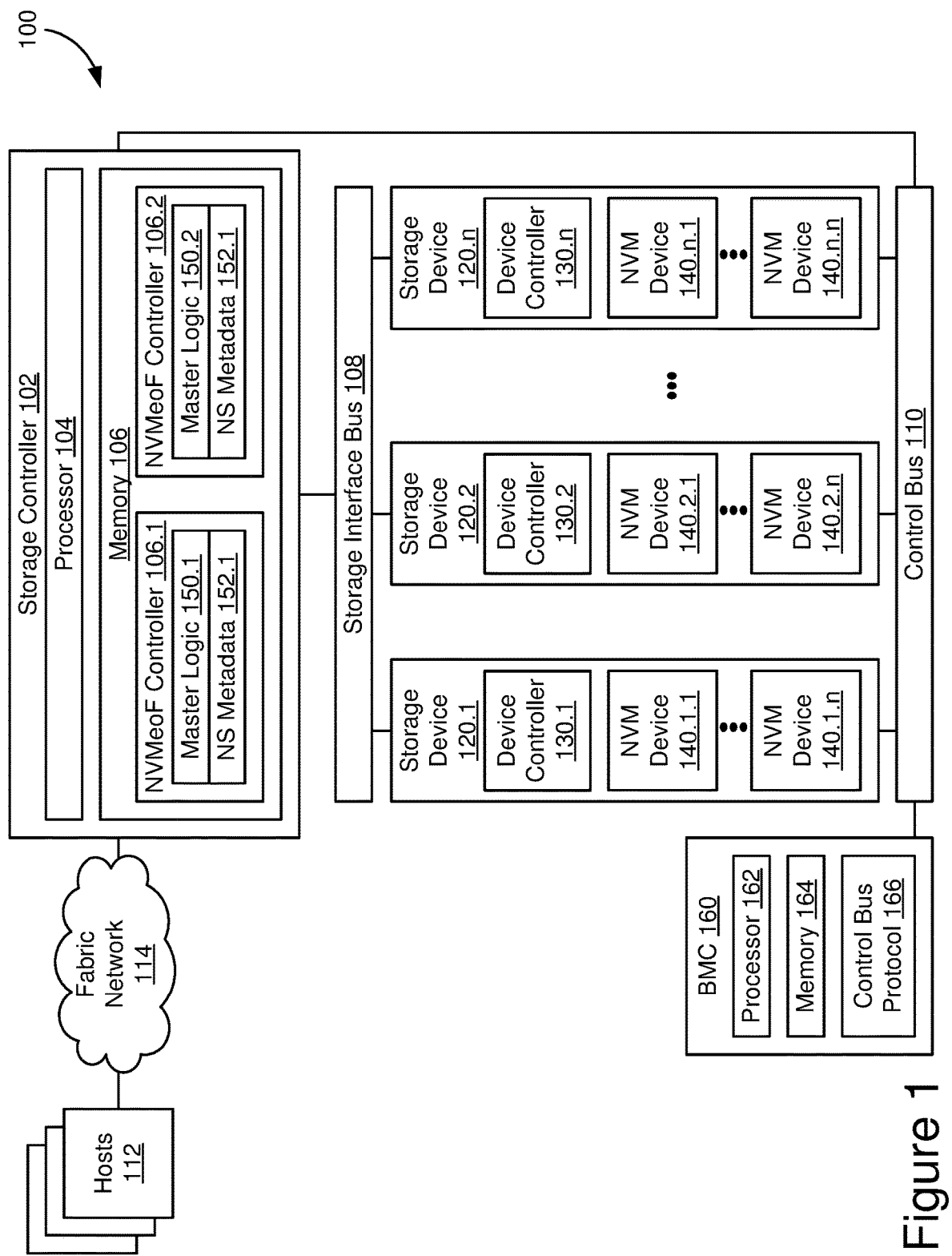
FIG. 1 schematically illustrates a multi-device storage system supporting a plurality of host systems.

FIG. 1 shows an embodiment of an example data storage system 100 with multiple data storage devices 120 supporting a plurality of host systems 112 through storage controller 102. While some example features are illustrated, various other features have not been illustrated for the sake of brevity and so as not to obscure pertinent aspects of the example embodiments disclosed herein. To that end, as a non-limiting example, data storage system 100 may include one or more data storage devices 120 (also sometimes called information storage devices, storage devices, disk drives, or drives) configured in a storage node with storage controller 102. In some embodiments, storage devices 120 may be configured in a server, storage array blade, all flash array appliance, just-a-bunch-of-flash (JBOF) enclosure, or similar storage unit for use in data center storage racks or chassis. Storage devices 120 may interface with one or more host nodes or host systems 112 and provide data storage and retrieval capabilities for or through those host systems. In some embodiments, storage devices 120 may be configured in a storage hierarchy that includes storage nodes, storage controllers (such as storage controller 102), and/or other intermediate components between storage devices 120 and host systems 112. For example, each storage controller 102 may be responsible for a corresponding set of storage devices 120 in a storage node and their respective storage devices may be connected through a corresponding backplane network or internal bus architecture including storage interface bus 108 and/or control bus 110, though only one instance of storage controller 102 and corresponding storage node components are shown. In some embodiments, storage controller 102 may include or be configured within a host bus adapter for connecting storage devices 120 to fabric network 114 for communication with host systems 112.

In the embodiment shown, a number of storage devices 120 are attached to a common storage interface bus 108 for host communication through storage controller 102. For example, storage devices 120 may include a number of drives arranged in a storage array, such as storage devices sharing a common rack, unit, or blade in a data center or the SSDs in an all flash array. In some embodiments, storage devices 120 may share a backplane network, network switch(es), and/or other hardware and software components accessed through storage interface bus 108 and/or control bus 110. For example, storage devices 120 may connect to storage interface bus 108 and/or control bus 110 through a plurality of physical port connections that define physical, transport, and other logical channels for establishing communication with the different components and subcomponents for establishing a communication channel to host 112. In some embodiments, storage interface bus 108 may provide the primary host interface for storage device management and host data transfer, and control bus 110 may include limited connectivity to the host for low-level control functions.

In some embodiments, storage devices 120 may be referred to as a peer group or peer storage devices because they are interconnected through storage interface bus 108 and/or control bus 110. In some embodiments, storage devices 120 may be configured for peer communication among storage devices 120 through storage interface bus 108, with or without the assistance of storage controller 102 and/or host systems 112. For example, storage devices 120 may be configured for direct memory access using one or more protocols, such as non-volatile memory express (NVMe), remote direct memory access (RDMA), NVMe over fabric (NVMeOF), etc., to provide command messaging and data transfer between storage devices using the high-bandwidth storage interface and storage interface bus 108.

In some embodiments, data storage devices 120 are, or include, solid-state drives (SSDs). Each data storage device 120.1-120.*n* may include a non-volatile memory (NVM) or device controller 130 based on compute resources (processor and memory) and a plurality of NVM or media devices 140 to provide a non-volatile storage medium for data storage (e.g., one or more NVM device(s), such as one or more flash memory devices). In some embodiments, a respective data storage device 120 of the one or more data storage devices includes one or more NVM controllers, such as flash controllers or channel controllers (e.g., for storage devices having NVM devices in multiple memory channels). In some embodiments, data storage devices 120 may each be packaged in a housing, such as a multi-part sealed housing with a defined form factor and ports and/or connectors for interconnecting with storage interface bus 108 and/or control bus 110.

In some embodiments, a respective data storage device 120 may include a single medium device while in other embodiments the respective data storage device 120 includes a plurality of media devices. In some embodiments, media devices include NAND-type flash memory or NOR-type flash memory. In some embodiments, data storage device 120 may include one or more hard disk drives (HDDs). In some embodiments, data storage devices 120 may include a flash memory device, which in turn includes one or more flash memory die, one or more flash memory packages, one or more flash memory channels or the like. However, in some embodiments, one or more of the data storage devices 120 may have other types of non-volatile data storage media (e.g., phase-change random access memory (PCRAM), resistive random access memory (ReRAM), spin-transfer torque random access memory (STT-RAM), magneto-resistive random access memory (MRAM), etc.).

In some embodiments, each storage device 120 includes a device controller 130, which includes one or more processing units (also sometimes called central processing units (CPUs), processors, microprocessors, or microcontrollers) configured to execute instructions in one or more programs. In some embodiments, the one or more processors are shared by one or more components within, and in some cases, beyond the function of the device controllers. In some embodiments, device controllers 130 may include firmware for controlling data written to and read from media devices 140, one or more storage (or host) interface protocols for communication with other components, as well as various internal functions, such as garbage collection, wear leveling, media scans, and other memory and data maintenance. For example, device controllers 130 may include firmware for running the NVM layer of an NVMe storage protocol alongside media device interface and management functions specific to the storage device. Media devices 140 are coupled to device controllers 130 through connections that typically convey commands in addition to data, and optionally convey metadata, error correction information and/or other information in addition to data values to be stored in media devices and data values read from media devices 140. Media devices 140 may include any number (i.e., one or more) of memory devices including, without limitation, non-volatile semiconductor memory devices, such as flash memory device(s).

In some embodiments, media devices 140 in storage devices 120 are divided into a number of addressable and individually selectable blocks, sometimes called erase blocks. In some embodiments, individually selectable blocks are the minimum size erasable units in a flash memory device. In other words, each block contains the minimum number of memory cells that can be erased simultaneously (i.e., in a single erase operation). Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector or codeword, which is a subunit of a page. That is, a block includes a plurality of pages, each page contains a plurality of sectors or codewords, and each sector or codeword is the minimum unit of data for reading data from the flash memory device.

A data unit may describe any size allocation of data, such as host block, data object, sector, page, multi-plane page, erase/programming block, media device/package, etc. In some configurations, the data unit may be the value portion of a key-value pair, where hosts 112 may define a key and provide a corresponding data unit of unstructured data (from a storage device perspective) having a memory size selected by the host. Storage devices 120 may store the key as a unique index value and map storage locations meeting the memory size in NVM devices 140 for storing the data unit. Storage locations may include physical and/or logical locations on storage devices 120 and may be described and/or allocated at different levels of granularity depending on the storage medium, storage device/system configuration, and/or context. For example, the storage device may manage the variable sizes of key-value pairs by allocating appropriately sized storage locations mapped to the particular key for addressability for host read/write purposes but managed as pages within storage device addressing managed in the media flash translation layer (FTL) in other contexts. Media segments may include physical storage locations on storage devices 120, which may also correspond to one or more logical storage locations. In some embodiments, media segments may include a continuous series of physical storage location, such as adjacent data units on a storage medium, and, for flash memory devices, may correspond to one or more media erase or programming blocks.

In some embodiments, storage controller 102 may be coupled to data storage devices 120 through a network interface that is part of host fabric network 114 and includes storage interface bus 108 as a host fabric interface. In some embodiments, host systems 112 are coupled to data storage system 100 through fabric network 114 and storage controller 102 may include a storage network interface, host bus adapter, or other interface capable of supporting communications with multiple host systems 112. Fabric network 114 may include a wired and/or wireless network (e.g., public and/or private computer networks in any number and/or configuration) which may be coupled in a suitable way for transferring data. For example, the fabric network may include any means of a conventional data communication network such as a local area network (LAN), a wide area network (WAN), a telephone network, such as the public switched telephone network (PSTN), an intranet, the internet, or any other suitable communication network or combination of communication networks. From the perspective of storage devices 120, storage interface bus 108 may be referred to as a host interface bus and provides a host data path between storage devices 120 and host systems 112, through storage controller 102 and/or an alternative interface to fabric network 114.

Host systems 112, or a respective host in a system having multiple hosts, may be any suitable computer device, such as a computer, a computer server, a laptop computer, a tablet device, a netbook, an internet kiosk, a personal digital assistant, a mobile phone, a smart phone, a gaming device, or any other computing device. Host systems 112 are sometimes called a host, client, or client system. In some embodiments, host systems 112 are server systems, such as a server system in a data center. In some embodiments, the one or more host systems 112 are one or more host devices distinct from a storage node housing the plurality of storage devices 120 and/or storage controller 102. In some embodiments, host systems 112 may include a plurality of host systems owned, operated, and/or hosting applications belonging to a plurality of entities and supporting one or more quality of service (QoS) standards for those entities and their applications. Host systems 112 may be configured to store and access data in the plurality of storage devices 120 in a multi-tenant configuration with shared storage resource pools, such as host connections to namespaces defined in storage devices 120.

Storage controller 102 may include one or more central processing units (CPUs) or processors 104 for executing compute operations, storage management operations, and/or instructions for accessing storage devices 120 through storage interface bus 108. In some embodiments, processors 104 may include a plurality of processor cores which may be assigned or allocated to parallel processing tasks and/or processing threads for different storage operations and/or host storage connections. In some embodiments, processor 104 may be configured to execute fabric interface for communications through fabric network 114 and/or storage interface protocols for communication through storage interface bus 108 and/or control bus 110. In some embodiments, a separate network interface unit and/or storage interface unit (not shown) may provide the network interface protocol and/or storage interface protocol and related processor and memory resources.

Storage controller 102 may include a memory 106 configured to support a storage interface controller, such as NVMeoF controllers 106.1 and 106.2 that control communication between hosts 112 and storage devices 120 in accordance with a corresponding storage interface protocol. For example, NVMeoF controller 106.1 may support a plurality of namespaces allocated in storage devices 120 and manage access from hosts 112 through host connections to command queues allocated in storage devices 120. In some embodiments, memory 106 may include one or more dynamic random access memory (DRAM) devices for use by storage devices 120 for command, management parameter, and/or host data storage and transfer to support namespaces 150. In some embodiments, storage devices 120 may be configured for direct memory access (DMA), such as using remote direct memory access (RDMA) protocols, over storage interface bus 108.

In some configurations, NVMeoF controllers 106.1 and 106.2 may provide redundant interfaces for hosts 112 to access the shared storage resources of storage devices 120. In some configurations, multiple hosts from hosts 112 may have connections to the same namespace in one or more of storage devices 120. These hosts may share keys, objects, or blocks and support common applications supported by a shared namespace, enabling multiple hosts to issue store, retrieve, delete, and other host storage commands targeting the data in the namespaces. NVMeoF controllers 106.1 and 106.2 may support the use of mastership to control one or more administrative functions for namespaces accessible by multiple hosts. For example, any host may be configured to create new namespaces and those namespaces may subsequently be connected to by other hosts, but mastership may be used to give the creating host (or a subsequent host to which mastership is migrated) exclusive control over deleting or otherwise reconfiguring the namespace. NVMeoF controllers 106.1 and 106.2 may include master logic 150.1 and 150.2 configured to assign mastership, manage changes in mastership, and lock namespace delete or similar functions for exclusive access by the master host. For example, master logic 150.1 and 150.2 may include a set of functions that respond to new connection requests, namespace delete commands, and host connection timeout events to automatically manage a single connected host in the mastership role and prevent other hosts from deleting the namespace or otherwise rendering it unusable by the other connected host systems. NVMeoF controller 106.1 and 106.2 may include namespace metadata 152.1 and 152.2 for managing the host connection and mastership information for each namespace. For example, namespace metadata 152.1 and 152.2 may include one or more data structures that organize the set of host connections to each namespace according to namespace identifiers and host identifiers and track which host identifier has mastership based on master logic 150.1 and 150.2. In some configurations, NVMeoF controller 106.1 and 106.2 may maintain redundant copies of namespace metadata 152.1 and 152.2 and use synchronization to assure that both controllers have the same mastership for the namespaces that they jointly manage.

In some embodiments, data storage system 100 may include a baseboard management controller (BMC) 160. BMC 160 may include a specialized service processor that monitors the physical state of a computer, network server or other hardware device using sensors and communicating with the system administrator through an independent connection. In data storage system 100, BMC 160 may provide valuable information about the status and health of data storage devices 120, including temperature, drive status, and other physical conditions that could affect the performance or availability of the storage. BMC 160 may include a processor 162 and a memory 164 that operate independently of the host system's CPU, firmware, and operating system, such as storage controller 102, allowing it to function even when the storage system is powered down or otherwise nonfunctional. In addition to its functions for remote management and monitoring of storage systems from an administrative system, BMC 160 may support an additional communication channel through control bus 110 to storage devices 120 and other subcomponents of data storage system 100, including NVMeoF controllers 106.1 and 106.2. For example, BMC 160 and control bus 110 may support low bandwidth communication protocols, such as Inter-Integrated Circuit (I2C), Serial Peripheral Interface (SPI), Improved Inter-Integrated Circuit (I3C), System Management Bus (SMBus), Universal Asynchronous Receiver/Transmitter (UART), or similar control bus protocols. For example, I2C is a synchronous, multi-master, multi-slave, packet-switched, single-ended, serial communication bus and corresponding protocol that may allow NVMeoF controllers 106.1 and 106.2 to communicate directly to share namespace metadata and/or use communication with BMC 160 and memory 164 as an intermediary for data synchronization.

In some embodiments, data storage system 100 includes one or more processors, one or more types of memory, a display and/or other user interface components such as a keyboard, a touch screen display, a mouse, a track-pad, and/or any number of supplemental devices to add functionality. In some embodiments, data storage system 100 does not have a display and other user interface components.

Figure 2A:
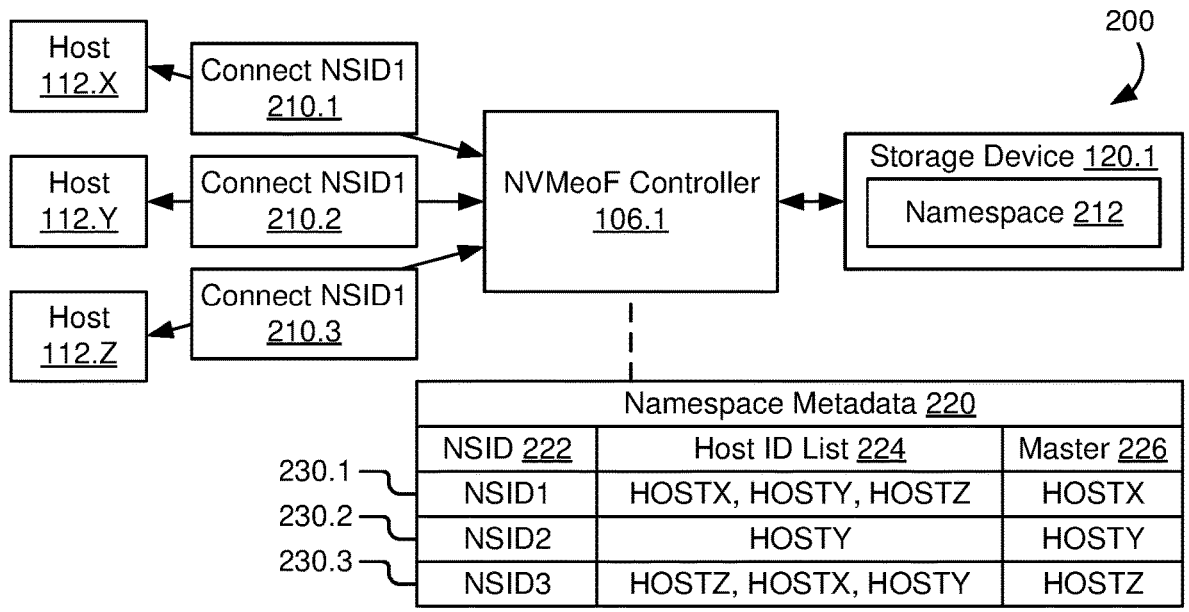
FIG. 2a schematically illustrates an example storage system for managing mastership for multiple hosts.

FIG. 2a shows a schematic representations of an example storage system 200, such as an all flash array or just-a-bunch-of-flash (JBOF) enclosure using NVMeoF interface protocols to support hosts 112.X, 112.Y, 112.Z shared access to namespace 212 in storage device 120.1. In some configurations, storage system 200 may be configured similarly to multi-device storage system 100 in FIG. 1. In FIG. 2a, hosts 112 each issue a namespace connect command 210 with the same target namespace identifier (NSID) for namespace 212 in storage device 120.1 through NVMeoF controller 106.1. For example, host 112.X may send connection command 210.1 at a first time targeting NSID1, host 112.Y may send a subsequent connection command 210.2 targeting NSID1, and host 112.Z may later send connection command 210.3 for NSID1. All three may successfully connect to NSID1 through NVMeoF controller 106.1, but only one of them may be granted mastership based on the master logic in NVMoeF 106.1. In the current example, NVMeoF 106.1 created the first connection to NSID1 based on the first connection request from host 112.X and host 112.X will be granted mastership. The master logic will be further described below with regard to method 250.

In some embodiments, NVMeoF controller 106.1 may use a data structure for namespace metadata 220 to manage host connection data and track mastership. For example, namespace metadata 220 may be a table maintained in the memory of NVMeoF controller 106.1 that stores namespace identifiers 222, host identifier lists 224, and mastership indicators 226 for each namespace. In the example shown, each NSID, such as a namespace qualified name (NQN) corresponds to and indexes a namespace entry 230, such as entry 230.1 for NSID1, entry 230.2 for NSID2, and entry 230.3 for NSID3. Each entry may include a host ID list that includes an ordered list of the corresponding host connections made to that namespace. For example, for NSID1, the host ID list includes host identifiers for the three hosts that send connection commands 210.1-210.3 in the order they were received-HOSTX, HOSTY, and HOSTZ. NSID2 only has one host connection and corresponding host identifier in host ID list 224 with HOSTY. NSID3 has the same three host connections as NSID1, but received them in a different order as reflected by the host ID list: HOSTZ, HOSTX, and HOSTY. Note that FIG. 2a does not show the connect commands for NSID2 or NSID3 that are the basis of the corresponding namespace entries 230.2 and 230.3. Mastership indicator 226 may indicate the host identifier for the host system that currently holds mastership. For example, HOSTX has mastership for NSID1, HOSTY has mastership for NSID2, and HOSTZ has mastership for NSID3. In the example shown, a separate field in the metadata table is used to track mastership indicator 226. In other embodiments, a flag or other indicator may be associated with the host ID in host ID list 224 and/or the position of the host identifier in the list may correspond to the mastership. For example, the first host ID position in host ID list 224 may correspond to the mastership and movement of host IDs within the list may be used to manage the current mastership and succession of mastership during mastership changes or migrations.

Figure 2B:
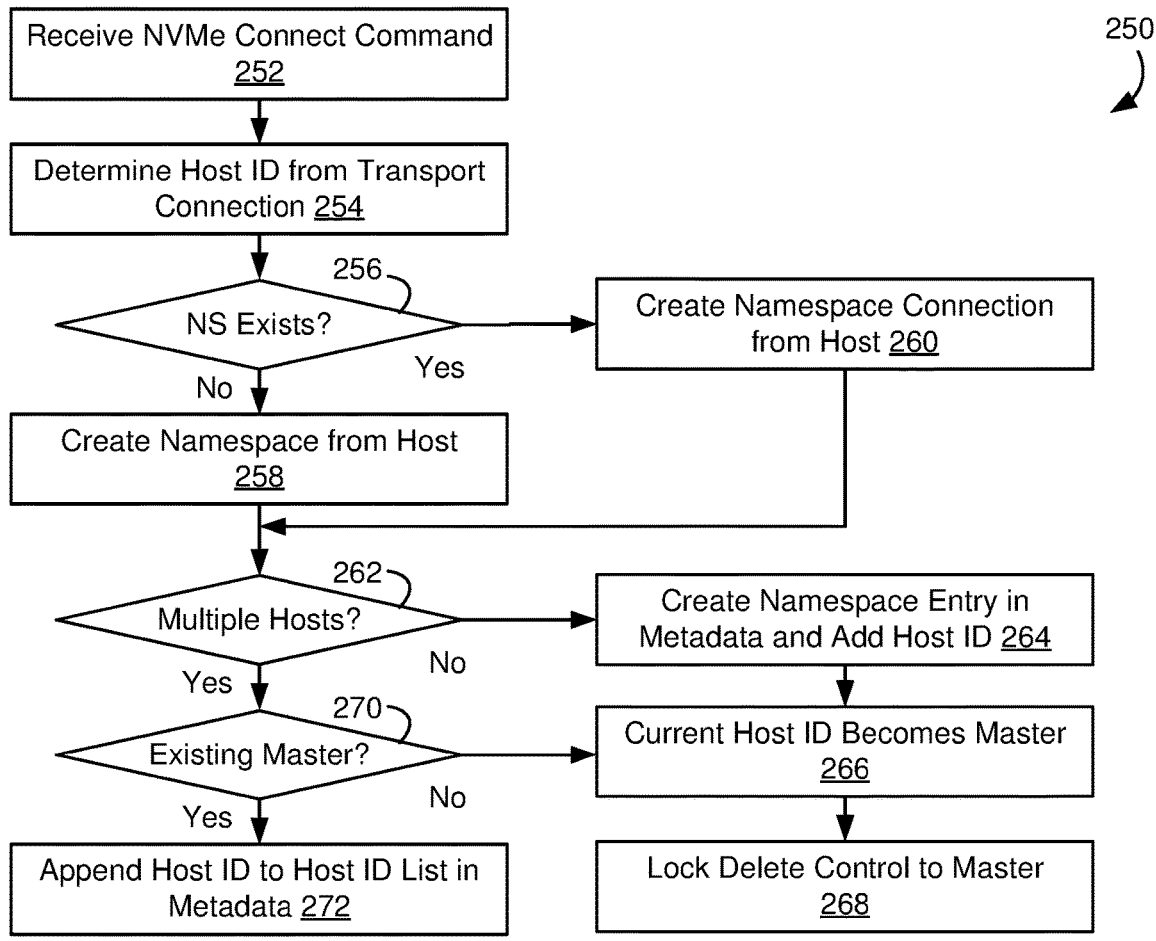
FIG. 2b is a flowchart of an example method of using the example storage system of FIG. 2a to lock delete control to a host with mastership.

In FIG. 2b, storage system 200 may be operated in accordance with method 250 to execute master logic for assigning, managing, and changing the master host to support locking the namespace delete function to that master host. At block 252, an NVMe connect command may be received by NVMeoF controller 106.1 from a host system, such as host 112.X. At block 254, NVMeoF controller 106.1 may determine the host identifier for the command from the transport connection, such as parsing HOSTX from the host NQN value in the transport parameters of the host connection request. At block 256, NVMeoF controller 106.1 may check whether the target namespace exists based on the namespace identifier in the request. If the namespace identifier does not yet exist, then method 250 may proceed wot block 258 to create the namespace. If the namespace identifier is already assigned to an existing namespace, then method 250 may proceed to block 260 to create a new connection between the requesting host and the namespace. In either case, NVMeoF controller 106.1 may check the credentials and permissions associated with the host identifier to determine whether the particular host is authorized to create and/or connect to the target namespace.

At blocks 262-272, NVMeoF controller 106.1 may apply master logic to determining mastership in response to the received connection command. At block 262, NVMeoF controller 106.1 may evaluate whether multiple hosts are connected to the target namespace. If not, method 250 may proceed to block 264 for the first host connection to the namespace. If so, method 250 may proceed to block 266 for managing multiple host connections. At block 264, NVMeoF controller 106.1 may create a namespace entry for the namespace identifier in namespace metadata 220 and add the host identifier to host ID list 224. At block 266, the current host identifier becomes the master and NVMeoF controller 106.1 may associate the host identifier with mastership indicator 226. At block 268, NVMeoF controller 106.1 may lock namespace delete control to the host identifier with mastership indicator 226.

At block 270, NVMeoF controller 106.1 may evaluate whether there is an existing master host for the namespace by checking namespace entry 230 for the namespace identifier. If no mastership is currently indicated, method 250 may proceed to block 266 and assign the mastership to the current host identifier. In some embodiments, mastership migration logic (described below) may be applied to determine the next host to receive mastership (where multiple host connections are active) before proceeding to block 266. If mastership is already assigned to another host identifier, method 250 may proceed to block 272 and NVMeoF controller 106.1 may append the new host identifier to host ID list 224 in namespace metadata 220.

Figure 3:
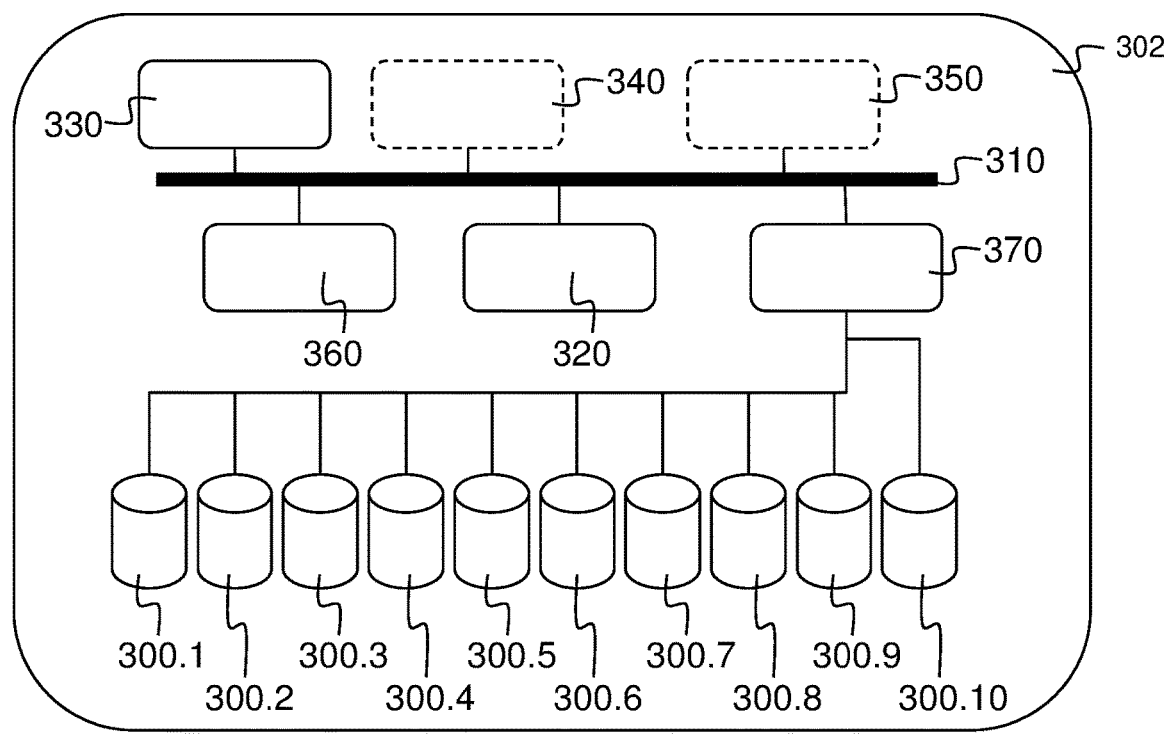
FIG. 3 schematically illustrates a storage node of the multi-device storage system of FIG. 1.

FIG. 3 shows a schematic representation of a storage node 302. For example, storage controller 102 may be configured as a storage node 302 for accessing storage devices 120 as storage elements 300. Storage node 302 may comprise a bus 310, a storage node processor 320, a storage node memory 330, one or more optional input units 340, one or more optional output units 350, a communication interface 360, a storage element interface 370 and a plurality of storage elements 300.1-300.10. In some embodiments, at least portions of bus 310, processor 320, local memory 330, communication interface 360, storage element interface 370 may comprise a storage controller, backplane management controller, network interface controller, or host bus interface controller, such as storage controller 102. Bus 310 may include one or more conductors that permit communication among the components of storage node 302. Processor 320 may include any type of conventional processor or microprocessor that interprets and executes instructions. Local memory 330 may include a random-access memory (RAM) or another type of dynamic storage device that stores information and instructions for execution by processor 320 and/or a read only memory (ROM) or another type of static storage device that stores static information and instructions for use by processor 320. Input unit 340 may include one or more conventional mechanisms that permit an operator to input information to said storage node 302, such as a keyboard, a mouse, a pen, voice recognition and/or biometric mechanisms, etc. Output unit 350 may include one or more conventional mechanisms that output information to the operator, such as a display, a printer, a speaker, etc. Communication interface 360 may include any transceiver-like mechanism that enables storage node 302 to communicate with other devices and/or systems, for example mechanisms for communicating with other storage nodes 302 or host systems 112. Storage element interface 370 may comprise a storage interface, such as a Serial Advanced Technology Attachment (SATA) interface, a Small Computer System Interface (SCSI), peripheral computer interface express (PCIe), etc., for connecting bus 310 to one or more storage elements 300, such as one or more storage devices 120, for example, 2 terabyte (TB) NVMe solid state drives (SSDs), and control the reading and writing of data to/from these storage elements 300. As shown in FIG. 3, such a storage node 302 could comprise ten 2 TB NVMe disk drives as storage elements 300.1-300.10 and, in this way, storage node 302 would provide a storage capacity of 20 TB to the storage system 100.

Storage elements 300 may be configured as redundant or operate independently of one another. In some configurations, if one particular storage element 300 fails its function can easily be taken on by another storage element 300 in the storage system. Furthermore, the independent operation of the storage elements 300 allows to use any suitable mix of types storage elements 300 to be used in a particular storage system 100. It is possible to use for example storage elements with differing storage capacity, storage elements of differing manufacturers, using different hardware technology such as for example conventional hard disks and solid-state storage elements, using different storage interfaces, and so on. All this results in specific advantages for scalability and flexibility of storage system 100 as it allows to add or remove storage elements 300 without imposing specific requirements to their design in correlation to other storage elements 300 already in use in that storage system 100.

Figure 4:
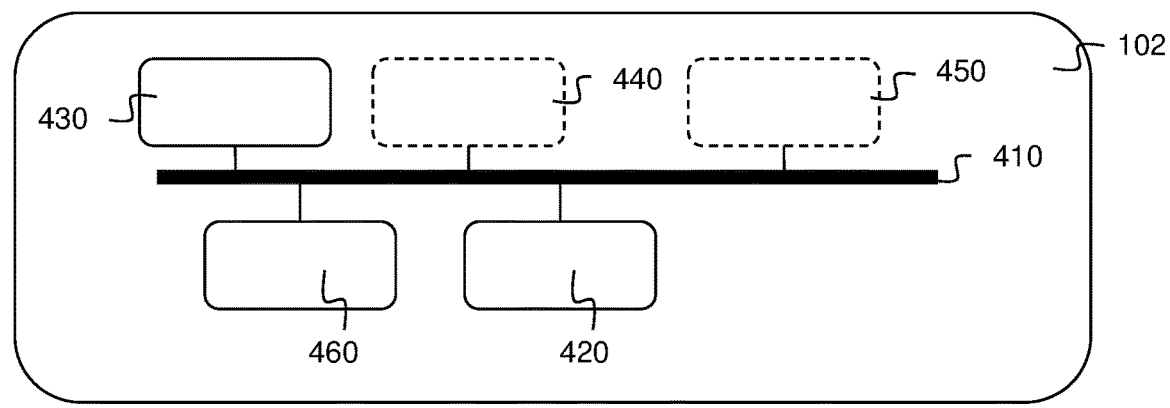
FIG. 4 schematically illustrates a host node of the multi-device storage system of FIG. 1.

FIG. 4 shows a schematic representation of an example host system 112. Host system 112 may comprise a bus 410, a processor 420, a local memory 430, one or more optional input units 440, one or more optional output units 450, and a communication interface 460. Bus 410 may include one or more conductors that permit communication among the components of host 112. Processor 420 may include any type of conventional processor or microprocessor that interprets and executes instructions. Local memory 430 may include a random access memory (RAM) or another type of dynamic storage device that stores information and instructions for execution by processor 420 and/or a read only memory (ROM) or another type of static storage device that stores static information and instructions for use by processor 420 and/or any suitable storage element such as a hard disc or a solid state storage element. An optional input unit 440 may include one or more conventional mechanisms that permit an operator to input information to host 112 such as a keyboard, a mouse, a pen, voice recognition and/or biometric mechanisms, etc. Optional output unit 450 may include one or more conventional mechanisms that output information to the operator, such as a display, a printer, a speaker, etc. Communication interface 460 may include any transceiver-like mechanism that enables host 112 to communicate with other devices and/or systems.

Figure 5:
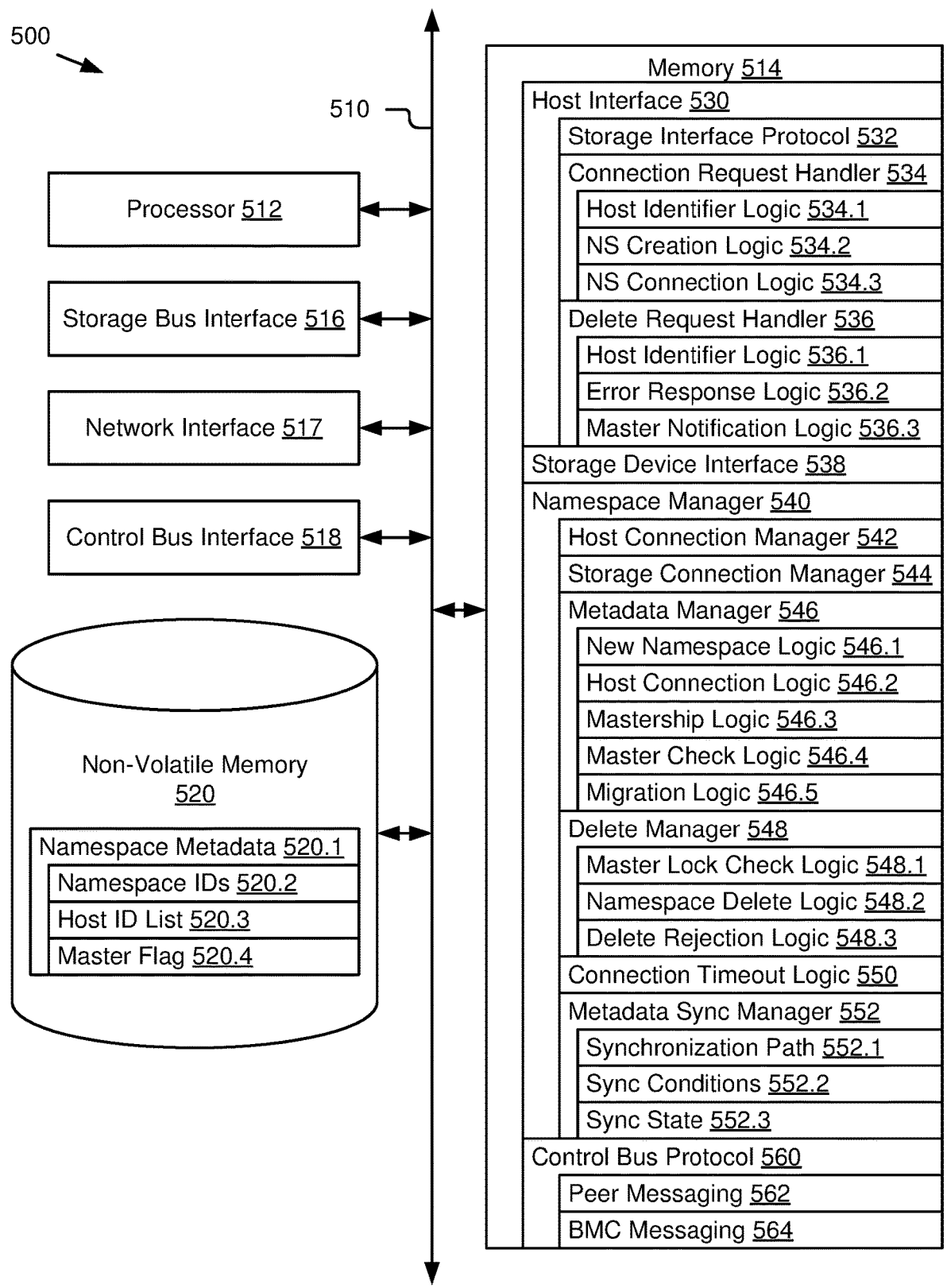
FIG. 5 schematically illustrates some elements of the storage controller of FIGS. 1-3 in more detail.

FIG. 5 schematically shows selected modules of a storage system 500 configured for using mastership to manage namespace delete operations. Storage system 500 may incorporate elements and configurations similar to those shown in FIGS. 1-3. For example, storage system 500 may be configured as NVMeoF controller 106.1 or 106.2 in FIGS. 1 and 2a and/or a storage node 302 in FIG. 3. In some embodiments, storage system 500 may be embodied in a hardware NVMeoF controller, such as a specialized circuit device that manages the communication between hosts and storage devices in an NVMe-oF network. The NVMeoF controller may be responsible for receiving storage commands from hosts, directing these commands to the appropriate namespaces in the storage devices, and managing the responses. As described below, one or more NVMe-oF controllers may be configured to maintain mastership information and use it to manage namespace delete operations for the namespaces in the connected data storage devices.

Storage system 500 may include a bus 510 interconnecting at least one processor 512, at least one memory 514, and at least one interface, such as storage bus interface 516, network interface 517, and/or control bus interface 518. Bus 510 may include one or more conductors that permit communication among the components of storage system 500. Processor 512 may include any type of processor or microprocessor that interprets and executes instructions or operations. Memory 514 may include a random access memory (RAM) or another type of dynamic storage device that stores information and instructions for execution by processor 512 and/or a read only memory (ROM) or another type of static storage device that stores static information and instructions for use by processor 512 and/or any suitable storage element such as a hard disk or a solid state storage element. In some configurations, non-volatile memory devices 520 may include storage controller memory devices supporting memory 514 and/or allocated for system use in one or more of the attached SSDs. For example, non-volatile memory 520 may include onboard memory of one or more NVMeoF controllers used to store namespace metadata 520.1.

Storage bus interface 516 may include a physical interface for connecting to one or more data storage devices, such as through a storage interface controller, using an interface protocol that supports storage device access. For example, storage bus interface 516 may include a network (e.g., ethernet), PCIe, or similar storage interface connector supporting NVMe access to solid state media comprising non-volatile memory devices. In some configurations, storage bus interface 516 may be an ethernet interface configured for NVMeoF access to a set of data storage devices in a housing of storage system 500. These connected data storage devices may include one or more non-volatile memory devices or similar storage elements configured to store host data organized in namespaces or similar logical data containers. For example, non-volatile memory devices may include a plurality of flash memory packages organized as an addressable memory array.

Network interface 517 may be used by storage system 500 to communicate with a number of host systems. Network interface 517, also known as a host interface, may be a hardware component or a software module that provides a communication channel between storage system 500 and the host systems. Network interface 517 support various network protocols, such as Ethernet, Fibre Channel, or Infini-Band, to facilitate the communication between storage system 500 and the host systems. The choice of network protocol can depend on various factors, such as the network infrastructure, the performance requirements, and the compatibility with the host systems, the storage devices, and NVMeoF protocols.

Control bus interface 518 may be used by storage system 500 to communicate with other hardware systems or subsystems, such as a baseboard management controller, and provide a communication path among subsystem components, such as multiple NVMe-F controllers. Control bus interface 518 may include a physical interface for connecting to a control bus using a low-bandwidth interface protocol for low-level control messaging among computing components. For example, control bus interface 518 may include a I2C, I3C, SPI, SMBus, UART, or similar bus interface connector supporting component-to-component messaging, such as multi-master, packet-based messaging over a two-wire bus.

Storage system 500 may include a plurality of modules or subsystems that are stored and/or instantiated in memory 514 for execution by processor 512 as instructions or operations. For example, memory 514 may include a host interface 530 configured to receive, process, and respond to host connection and data requests from client or host systems. Memory 514 may include a storage interface configured to establish backend connections with data storage devices hosting namespaces and processing host storage commands. Memory 514 may include a namespace manager 540 configured to manage host connections to namespaces through storage system 500. Memory 514 may include control bus protocol that controls communication through control bus interface 518.

Host interface 530 may include an interface protocol and/or set of functions and parameters for receiving, parsing, responding to, and otherwise managing requests from host devices, nodes, or systems. For example, host interface 530 may include functions for receiving and processing host requests for establishing host connections with one or more namespaces for reading, writing, modifying, or otherwise manipulating client or host data in accordance with host communication and storage protocols. In some embodiments, host interface 530 may enable direct memory access and/or access over NVMe protocols, such as RDMA and transmission control protocol/internet protocol (TCP/IP) access, through storage bus interface 516 to host data units stored in the non-volatile memory devices of connected data storage devices. For example, host interface 530 may include host communication protocols compatible with ethernet and/or another host interface that supports use of NVMe and/or RDMA protocols for data access to host data.

In some embodiments, host interface 530 may include a plurality of hardware and/or software modules configured to use processor 512 and memory 514 to handle or manage defined operations of host interface 530. For example, host interface 530 may include a storage interface protocol 532 configured to comply with the physical, transport, and storage application protocols supported by the host for communication over network interface 517. For example, host interface 530 may include a connection request handler 534 configured to receive and respond to host connection requests. For example, host interface 530 may include a delete request handler 536 configured to receive namespace delete commands from hosts. In some embodiments, host interface 530 may include additional modules (not shown) for command handling, buffer management, storage device management and reporting, and other host-side functions.

In some embodiments, storage interface protocol 532 may include network and/or PCIe and NVMe compliant communication, command, and syntax functions, procedures, and data structures. In some embodiments, storage interface protocol 532 may include an NVMeoF or similar protocol supporting RDMA, transmission control protocol/internet protocol (TCP/IP), and/or other connections for communication between host nodes and target host data in connected data storage devices, such as namespaces mapped to the particular host. Storage interface protocol 532 may include interface definitions for receiving host connection requests and storage commands from the fabric network, as well as for providing responses to those requests and commands. In some embodiments, storage interface protocol 532 may assure that host interface 530 is compliant with host request, command, and response syntax while storage device interface 538 may be configured to interface with the data storage devices for processing host storage commands.

In some embodiments, connection request handler 534 may include interfaces, functions, parameters, and/or data structures for receiving host connection requests in accordance with storage interface protocol 532, determining an available command queue, such as a queue-pair, allocating the host connection (and corresponding host connection identifier) to a storage device processing queue, and providing a response to the host, such as confirmation of the host storage connection or an error reporting that no processing queues are available. For example, connection request handler 534 may receive a storage connection request for a target namespace in a NVMe-oF storage device and provide an appropriate namespace storage connection (through namespace manager 540) and host response. Connection request handler 534 may include host identifier logic 534.1 configured to use transport parameters from the host connection request to determine the host identifier of the request. Note that host identifiers may include host NQNs and are distinct from host connection identifiers, which identify a specific host connection to a namespace (and may support multiple connections from the same host to the same namespace). Namespace creation logic 534.2 may be initiated by connection request handler 534 in response to a host connection request for a namespace identifier that does not yet exist in the data storage devices. Namespace creation logic 543.2 may be configured to create a new namespace by allocating available storage space and a supported namespace from a data storage device to the new namespace identifier. For example, namespace creation logic 534.2 may initiate namespace manager 540 and storage device interface 538 to determine a target storage device and allocate the namespace in that storage device. Namespace connection logic 534.3 may be initiated by connection request handler 534 for an existing or newly created namespace to allocate a new host connection to that namespace for the requesting host. For example, namespace connection logic 534.2 may allocate a specific queue pair and host connection identifier to the combination of the host identifier and the namespace identifier. That connection may then be used for processing host storage commands to the namespace. In some embodiments, data describing each host connection request and/or resulting host connection may be stored by namespace manager 540.

In some embodiments, delete request handler 536 may include interfaces, functions, parameters, and/or data structures for receiving namespace delete requests in accordance with storage interface protocol 532, pass the request and host identifier to namespace manager 540 for evaluating mastership, and providing a response to the host, such as confirmation or rejection of the namespace delete request. For example, each time a namespace delete request, which is a host request to delete a namespace identifier and render all data stored in that namespace inaccessible (and subject to garbage collection and reuse of the previously allocated storage space), delete request handler 536 uses host identifier logic 536.1 (which operates similarly to host identifier logic 534.1) to determine the host identifier and sends the namespace identifier and the host identifier for the namespace delete request to namespace manager 540. Namespace manager 540 determines whether the host has mastership to process the delete request or does not have mastership and the request should be rejected. In addition to a confirmation response for successfully completing the delete request, delete request handler 536 may include error response logic 536.2 configured to generate an error notification to the requesting host denying access for namespace delete and, in some embodiments, identifying the host identifier of the host system that has mastership (and delete authority). For example, a vendor-specific "NS_NOT_AUTHORIZED" error message may be returned. In some embodiments, delete request handler 536 may also be configured to respond to denied delete request by using master notification logic 536.3 to send an interrupt message to the host identifier with mastership informing that host system of the attempt to delete the namespace and/or the host identifier associated with the denied namespace delete request.

Storage device interface 538 may include an interface protocol and/or set of functions, parameters, and data structures for communicating with connected data storage devices to establish host connections and enable command queue pairs (submission queues and completion queues) for processing host storage commands. Storage device interface 538 may be configured with a storage interface protocol similar to storage interface protocol 532, but supporting the backend connection between storage system 500 and the set of data storage devices it supports. For example, storage device interface 538 may receive host storage commands received by host interface 530 and direct them through one or more switches to the target data storage devices for processing. In some configurations, storage device interface 538 may also support administrative communication (such as via administrative queues and commands) for managing storage device and namespace configuration and other backend functions. In some configurations, one or more NVMeoF controllers and corresponding input/output modules of storage device interface 538 may be the only "hosts" connected to and visible from the storage devices and the storage devices may rely on storage device interface 538 for receiving all host storage commands and administrative commands.

Namespace manager 540 may include a set of functions, parameters, and data structures for managing namespaces and corresponding host connections in storage system 500. For example, namespace manager 540 may receive host connection requests and determine corresponding storage connections for each namespace, as well as managing namespace creation, deletion, and mastership indicators. In some configurations, some or all functions of namespace manager 540 may be embodied in NVMeoF controller firmware operating as an intermediary between host interface 530 and storage device interface 538, and may use control bus protocol 560 for communication with other NVMeoF controllers in the same system. In some embodiments, namespace manager 540 may include a plurality of hardware and/or software modules configured to use processor 512 and memory 514 to handle or manage defined operations of namespace manager 540. For example, namespace manager 540 may include a host connection manager 542, a storage connection manager 544, a metadata manager 546, a delete manager 548, connection timeout logic 550, and metadata synchronization manager 552.

Host connection manager 542 and storage connection manager 544 may include interfaces, functions, parameters, and/or data structures configured to manage namespace allocations and connections between host systems and storage devices. For example, host connection manager 542 may include logic for receiving host connection requests and maintaining a list of host connection identifiers mapped to specific namespaces and queue pairs. Storage connection manager 544 may include logic for receiving the configurations of namespaces, command queues, and storage space available among storage devices and map new namespaces and host connections to the storage device resources. Host connection manager 542 and storage connection manager 544 may use metadata manager 546 and namespace metadata 520.1 to manage their respective front-end and back-end connections. Host connection manager 542 may be responsive to host interface 530 for processing host connection requests and delete requests, as well as managing host connection timeouts. Storage connection manager 544 may be responsive to storage device interface 538 and manage storage device namespace and queue pair allocations for completing host connections.

Metadata manager 546 may include interfaces, functions, parameters, and/or data structures configured to manage namespace and corresponding connection data to assist in managing namespaces. For example, metadata manager 546 may receive data generated or received by host interface 530, storage device interface 538, and/or other components of namespace manager 540 and store it in one or more data structures in namespace metadata 520.1. In some configurations, metadata manager 546 may create, configured, and maintain a namespace metadata table for tracking sets of host connections to each namespace and which host is designated with mastership for enabling namespace delete functions. For example, the namespace metadata table may be configured similarly to namespace metadata 220 in FIG. 2a and include namespace IDs 520.2, host ID lists 520.3, and master indicators, such as master flag 520.4. Metadata manager 546 may create a namespace entry indexed by namespace identifier as each new namespace is created, add host connection identifiers to host ID lists 520.3 as new connections are made, remove host identifiers for host connections that timeout, and manage the selection and migration of mastership status.

In some embodiments, metadata manager 546 may include new namespace logic 546.1 configured to generate new namespace entries responsive to a new namespace being created. Metadata manager 546 may include host connection logic 546.2 configured to add host IDs in the namespace entry when new connections are made to the namespace from different hosts. For example, each time a new host connection is made to a namespace, host connection logic 546.2 may receive a corresponding host identifier and search the host ID list for the namespace to see whether the host identifier is already present. If not, the new host identifier will be added to the host ID list, such as by appending the host ID to the end of the list in order of initial connection times. Metadata manager 546 may include mastership logic 546.3 configured to determine the initial mastership for a namespace and set the mastership indicator for the namespace entry. For example, mastership logic 546.3 may assign mastership to the host ID corresponding to the initial namespace connection request that created the namespace. Note that mastership logic 546.3 may operate automatically to establish mastership without any additional input or configuration by system administrators and mastership may operate in addition to credential verification and permissions that are defined through administrative configuration of storage system 500 to select among host systems that are all fully authorized users of the namespace. For example, mastership selection may operate in addition to other forms of namespace control, such as namespace reservation, private namespaces, or authentication-based namespace access, and does not rely on those features or the administrative configurations needed to support them. Metadata manager 546 may include master check logic 546.4 as a service that may be called by other components, such as host interface 530 and/or delete manager 548 to determine the host ID of the host system with mastership for a namespace. For example, master check logic 546.4 may receive a namespace identifier and return the host identifier corresponding to the current mastership indicator and/or may receive the namespace identifier and a requesting host identifier and return a value indicating whether or not the requesting host ID matches the host ID with mastership.

Metadata manager 546 may include migration logic 546.5 configured to determine changes in mastership over an operating period for a namespace. For example, periodically, responsive to a connection request or delete request, and/or responsive to a timeout event for a host connection, migration logic 546.5 may determine whether the prior mastership is still valid or all host connections to the namespace for the host ID with mastership have timed out. In some embodiments, migration logic 546.5 may define one or more timeout conditions for determining that a host system is no longer connected or active with regard to a namespace. For example, each time a namespace receives a host connection or namespace delete request, migration logic 546.5 may check the keep alive timeout (KATO) value for the host connections of the host ID that currently has mastership and, if the KATO has expired (meets a predetermined timeout threshold) for the connection (or connections), the mastership may be migrated to a new host identifier from the host ID list. In some configurations, a next host ID in the ordered list of host IDs for the namespace may be selected as the new master host. For example, the list of host IDs may be built and maintained in a priority order, such as the order of initial host connections, most recent host storage commands, relative volumes of host storage commands, pending commands (or current queue depths), or other parameters or schemes for ordering the priority of host IDs for inheriting the mastership. Migration logic 546.5 may be configured to check timeout conditions for each host ID (using connection timeout logic 550), select the next host ID for mastership, remove and/or reorder host IDs in the host ID list, and apply the mastership indicator to the new master host ID, such as placing that host ID first in the order, setting the mastership flag, or replacing the host ID in a mastership indicator field.

Delete manager 548 may include interfaces, functions, parameters, and/or data structures configured to manage processing of namespace delete requests for deleting namespaces. For example, delete manager 548 may receive namespace delete requests and corresponding host identifiers from host interface 530, determine whether the requesting host ID has mastership, and complete or reject the request based on the mastership delete lock. Delete manager 548 may include master lock check logic 348.1 configured to check whether the host ID making the delete request has mastership. For example, delete manager 548 may call master check logic 546.4 in metadata manager 546 to determine whether or not the received host ID matches the host ID with mastership in namespace metadata 520.1. If they match, namespace delete logic 548.2 may be initiated to delete the namespace, removing the namespace identifier, closing all host connections to that namespace, and making the namespace allocation and corresponding storage space in the storage devices available for a new namespace. If the host IDs are different, delete rejection logic 548.3 may be initiated to return error and/or notification messages as described above with regard to delete request handler 536. In some embodiments, the service call from delete manager 548 to master check logic 546.4 may trigger migration logic 546.5 if the master host is not longer active and the result returned may be based on the newly assigned mastership (which could be the requesting host).

Connection timeout logic 550 may include interfaces, functions, parameters, and/or data structures configured to manage processing of namespace delete requests for deleting namespaces. For example, NVMe-oF protocols include a mechanism for managing keep-alive timeouts (KATOs) to ensure the reliability of the connections between the hosts and the storage devices. A keep-alive timeout is a period of time during which a host system is expected to send a keep-alive message to the storage device to maintain its connection. If storage system 500 and/or storage devices connected thereto do not receive a keep-alive message from the host system within the specified timeout period, storage system 500 may assume that the host system is no longer connected or is experiencing issues, and it may take appropriate actions, such as closing the connection or reallocating resources. Connection timeout logic 550 may include or interface with timeout counters and keep alive message status for each host connection and provide KATO status and/or alerts to metadata manager 546 in response to timeout conditions being met for one or more host connections.

Metadata synchronization manager 552 may include interfaces, functions, parameters, and/or data structures configured to manage synchronization of namespace metadata across multiple controllers, such as two or more NVMeoF controllers in storage system 500 providing redundant NVMeoF communication paths from host systems to storage devices. For example, metadata sync manager 552 in one controller may coordinate with the metadata sync manager in the other controller to synchronize namespace metadata 520.1. Metadata sync manager 552 may include a synchronization path 552.1 configured for communication of the metadata between the controllers. For example, synchronization path 552.1 may be configured as a messaging path between the controllers through control bus interface 518 and using control bus protocol 560. In some embodiments, synchronization path 552.1 may include a peer messaging interface between the controllers that enables direct transmission of namespace metadata in the payload of control bus messages, such as new or updated namespace entries for namespace metadata 520.1. In some embodiments, synchronization path 552.1 may include use of BMC messaging to use the BMC as a repository or intermediary for update messages. For example, the BMC may provide a channel for relaying update messages between the controllers or may store an authoritative instance of namespace metadata 520.1 that may be updated and/or queried by multiple instances of namespace manager 540. Metadata sync manager 552 may include a set of sync conditions 552.2 configured to determine when metadata is shared between the controllers. For example, each time a new entry is created or an entry is modified in namespace metadata 520.1, synchronization conditions may be met and metadata sync manager 552 may generate an update message reflecting the data change to the other controller. Metadata sync manager 552 may include a synchronization state 552.3 that reflects the most recent updates processed and may be used between controllers to verify a current version of the namespace metadata and/or trigger synchronization if the state values are different.

Control bus protocol 560 may include an interface protocol and/or set of functions, parameters, and data structures for using control bus interface 518 and a corresponding control bus as a communication channel between components of storage system 500. For example, control bus protocol 560 may allow metadata sync manager 552 to communicate directly or indirectly between controllers to synchronize instances of namespace metadata 520.1. In some embodiments, control bus protocol 560 may support peer messaging 562 between hardware components of storage system 500, such as two NVMeoF controllers. In some embodiments, control bus protocol 560 may support BMC messaging 564 between hardware components of storage system 500 and an associated BMC. This may enable the BMC to act as an intermediary for message forwarding between components or act as a repository for namespace metadata 520.1 and/or changes thereto.

Figure 6A:
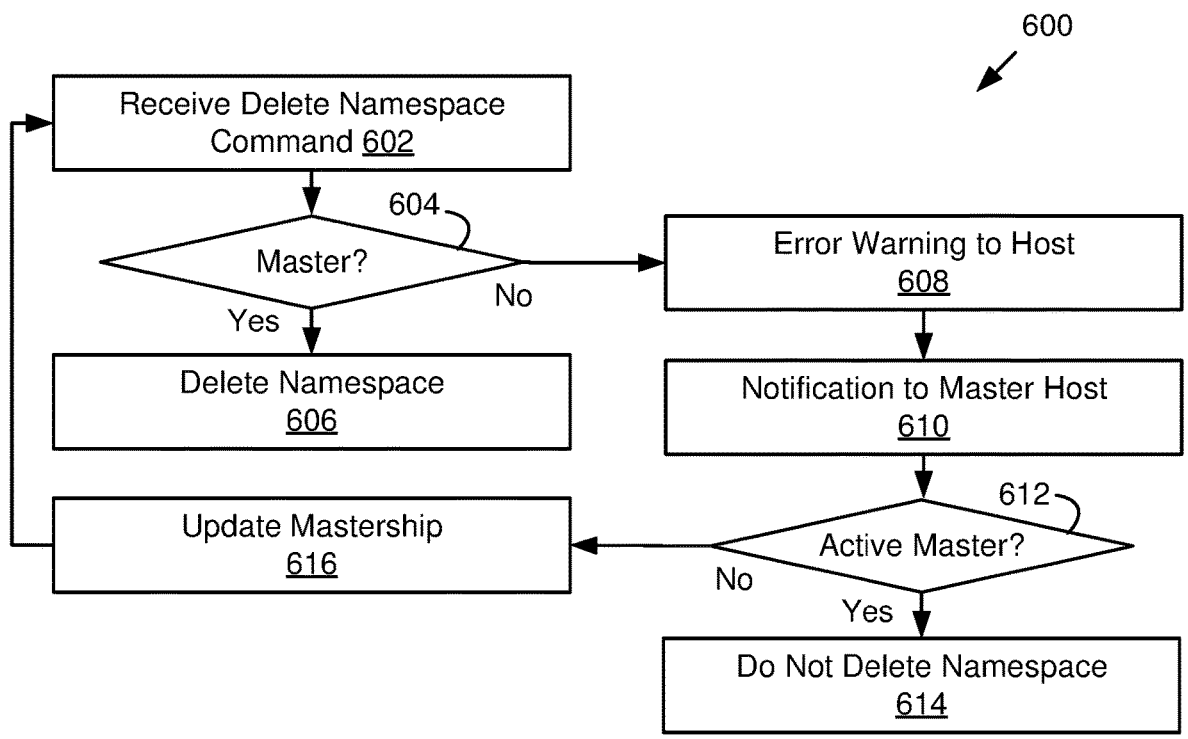
FIG. 6a is a flowchart of an example method of selectively processing namespace delete commands.

As shown in FIG. 6a, storage system 500 may be operated according to an example method for selectively processing namespace delete commands, i.e., according to method 600 illustrated by blocks 602-614 in FIG. 6a.

At block 602, a delete namespace command may be received. For example, the host interface may receive the delete namespace command or request from a host system and determine the host identifier for that host system.

At block 604, whether or not the requesting host is the master may be determined. For example, a namespace manager may compare the received host identifier to the host identifier with a mastership indicator in namespace metadata. If the requesting host is the master, method 600 may proceed to block 606 and delete the namespace. If the requesting host does not match the master host, method 600 may proceed to block 608.

At block 608, an error warning may be sent to the requesting host. For example, the host interface may generate a response message with a vendor-specific error message to the requesting host.

At block 610, a notification may be sent to the master host. For example, the host interface may also generate an interrupt message with a vendor-specific notification to the host system with mastership notifying that another host system has attempted to delete the namespace.

At block 612, whether or not the master host is still active may be determined. For example, the namespace manager may check whether a timeout condition has been met for the master and whether host connections are still active between the namespace and the master host system. If the master host is still active, method 600 may proceed to block 614 and the namespace is not deleted and the method ends. If the master host is no longer active, method 600 may proceed to block 616.

At block 616, the mastership may be updated. For example, the namespace manager may determine another host identifier from the set of host identifiers associated with the namespace to be a new master host and receive the mastership indicator. Migration of mastership is further described below with regard to FIG. 6b. Method 600 may return to block 602 and await a next attempt to delete the namespace.

Figure 6B:
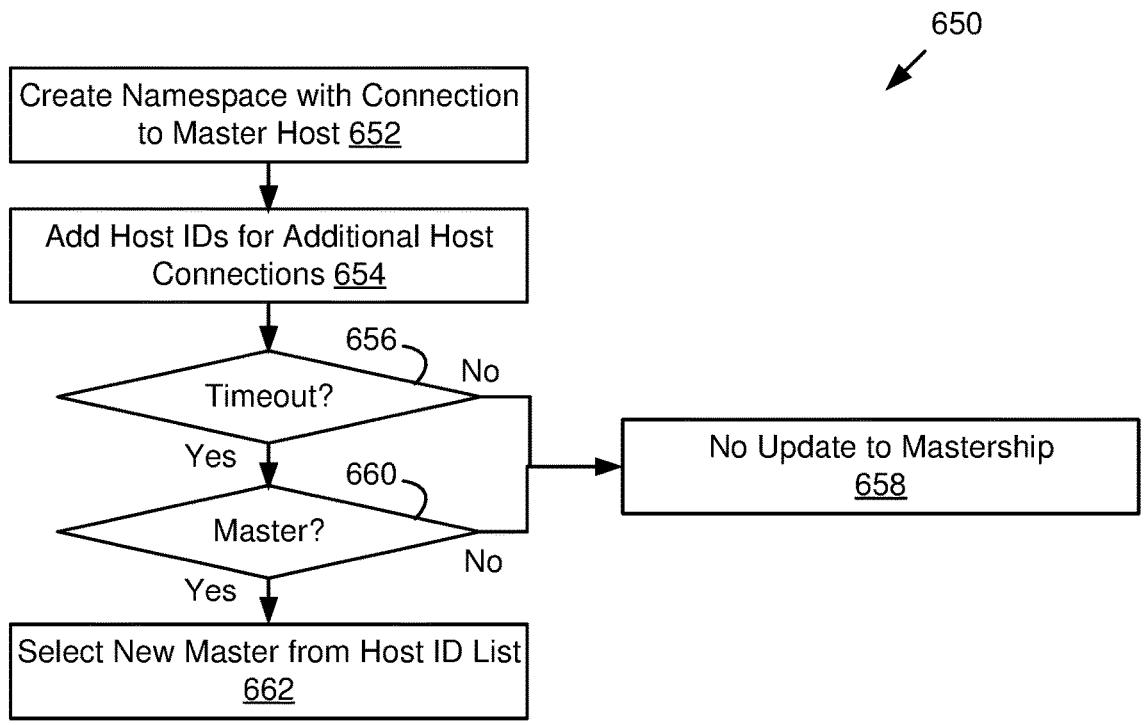
FIG. 6b is a flowchart of an example method of migrating mastership in response to host time out events.

As shown in FIG. 6b, storage system 500 may be operated according to an example method for migrating mastership in response to host time out events, i.e., according to method 650 illustrated by blocks 652-662 in FIG. 6b.

At block 652, a namespace may be created with a connection to a master host. For example, the namespace manager may create a namespace entry for the namespace identifier that grants mastership to the creating host ID when the namespace is created.

At block 654, host IDs may be added for additional host connections. For example, the namespace manager may add additional host IDs for other hosts that request connections to the namespace in the namespace entry.

At block 656, whether or not a timeout has occurred for any of the host connections may be determined. For example, the namespace manager may maintain keep alive timers for each host connection and generate a timeout event when a connection expires (e.g., the keep alive timer reaches a timeout threshold). If there is no timeout, method 650 may proceed to block 658 and no update is made to mastership. If there is a timeout, method 650 may proceed to block 660.

At block 660, whether or not the timeout is for the master host may be determined. For example, the namespace manager may respond to timeout events by evaluating whether all host connections for the host ID with the mastership indicator have expired. If yes, the master host is no longer active and method 650 may proceed with block 662. If no, method 650 may proceed to block 658 and no update is made to mastership. Note that, in some embodiments, other modifications to the namespace metadata may be made (such as removal of expired hosts from the host ID list), even if the master host has not expired.

At block 662, a new master may be selected from the host ID list for the namespace. For example, the namespace manager may select the next host ID in the host ID list after removal of the prior master host ID and assign the mastership indicator to that host ID.

Figure 7:
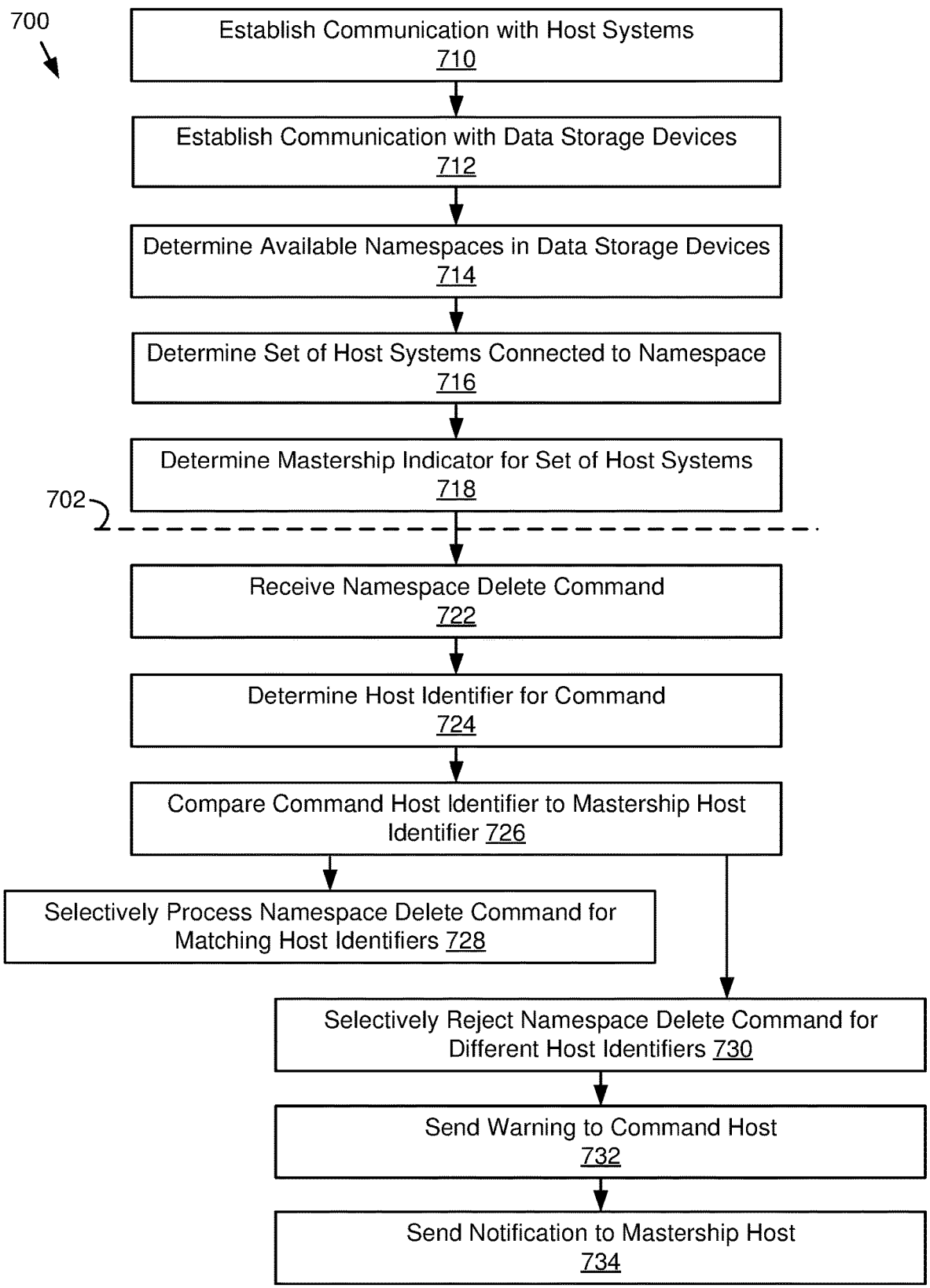
FIG. 7 is a flowchart of an example method of managing namespace delete commands using mastership.

As shown in FIG. 7, storage system 500 may be operated according to an example method for managing namespace delete commands using mastership, i.e., according to method 700 illustrated by blocks 710-734 in FIG. 7.

At block 710, communication may be established with host systems. For example, the storage system may be configured with a host interface that establishes network and/or storage bus communication with multiple host systems.

At block 712, communication may be established with data storage devices. For example, the storage system may be configured with a storage interface that establishes network and/or storage bus communication with multiple data storage devices.

At block 714, available namespaces may be determined in the data storage devices. For example, the NVMe data storage devices may each support a number of namespaces and queue pairs for processing host storage commands and the storage system may be determine the available namespaces for supporting host connection requests.

At block 716, a set of host systems may connect to a namespace. For example, the storage system may create a namespace with an assigned namespace identifier in response to a first request for the namespace and then process additional connection requests from other hosts to establish additional host connections to that namespace.

At block 718, a mastership indicator may be determined for the set of host systems. For example, the storage device may select the host system that created the namespace to initially receive the mastership indicator. At line 702, an operating period processing host storage commands from the set of host systems to the namespace may pass.

At block 722, a namespace delete command may be received. For example, the storage system may receive a namespace delete command or request from one host system of the set of host systems.

At block 724, the host identifier for the command may be determined. For example, the storage system may determine the host identifier from the transport parameters of the host connection through which the command was received.

At block 726, the command host identifier may be compared to the mastership host identifier. For example, the storage system may store a host identifier with mastership for the namespace and compare it to the received host identifier from the command to determine whether or not the host identifiers match.

At block 728, the namespace delete command may be selectively processed responsive to the host identifiers matching. For example, if the host identifiers are the same at block 726, then the namespace delete command may be processed as normal.

At block 730, the namespace delete command may be selectively processed responsive to the host identifiers being different. For example, if the host identifiers are different at block 726, the storage system may determine that the namespace is delete locked relative to the requesting host system and reject (not process) the namespace delete command.

At block 732, a warning may be sent to the command host system. For example, the storage system may return an error message indicating that the namespace delete command is being rejected and, in some embodiments, indicating the host identifier for the host system that has mastership.

At block 734, a notification may be sent to the host system with mastership. For example, the storage system may send an interrupt notification message to the host system with the mastership indicator to notify the system that a namespace delete was attempted and, in some embodiments, indicating the host system that sent the namespace delete command.

Figure 8:
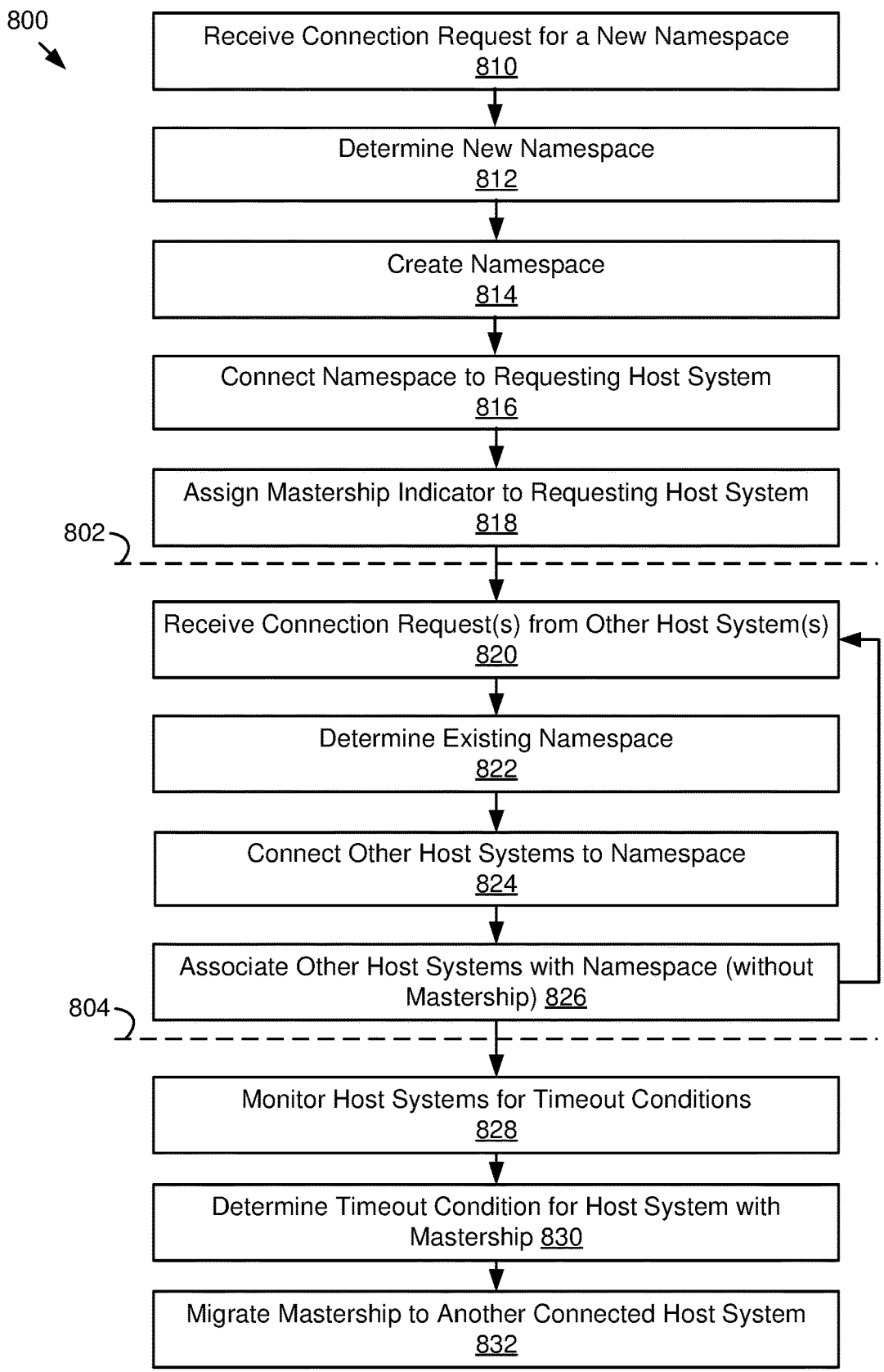
FIG. 8 is a flowchart of an example method of managing host connections and mastership indicators for namespaces.

As shown in FIG. 8, storage system 500 may be operated according to an example method for managing host connections and mastership indicators for namespaces, i.e., according to method 800 illustrated by blocks 810-832 in FIG. 8.

At block 810, a connection request may be received for a new namespace. For example, the storage system may receive a host connection request from a first host system for a namespace identifier that does not yet exist in the storage system.

At block 812, a new namespace may be determined. For example, the storage system may compare the received namespace identifier to the list of active namespace identifiers currently allocated among the connected storage devices and determine that the requested namespace identifier is not among them.

At block 814, a namespace may be created. For example, the storage system may allocate the namespace identifier to a specific namespace available in the storage devices.

At block 816, the namespace may be connected to the requesting host system. For example, the storage system may determine a host connection identifier for the host system and allocate a queue pair for the storage device hosting the namespace to processing host storage commands for that host connection.

At block 818, a mastership indicator may be assigned to the requesting host system. For example, the storage system may initially select the host identifier for the requesting host system to indicate mastership of the new namespace, such as by saving the namespace identifier and the host identifier associated with a mastership indicator in namespace metadata. At line 802, operating time may pass before additional connection requests are received from other host systems for the same namespace.

At block 820, connection requests may be received from other host systems. For example, the storage system may receive additional host connection requests indicating the same namespace identifier.

At block 822, an existing namespace may be determined. For example, the storage system may compare the namespace identifier in the new requests with the namespace identifiers assigned to existing namespaces and determine that the new requests relate to an existing namespace with existing namespace metadata and mastership indicator.

At block 824, other host systems may be connected to the namespace. For example, the storage system may determine additional host connection identifiers and allocate additional queue-pairs to processing host storage commands from these additional host systems using the same namespace and storage device(s).

At block 826, other host systems may be associated with the namespace without mastership. For example, the storage system may add host identifiers for each newly connected host system to the host identifiers associated with the namespace identifier in namespace metadata. At line 804, operating time may pass before one or more host connections timeout and may trigger migration of mastership.

At block 828, host systems may be monitored for timeout conditions. For example, the storage system may maintain keep alive timers for each host connection and require keep alive messages or events from each host system to keep those connections alive.

At block 830, a timeout condition for a host system with mastership may be determined. For example, the storage system may determine that one or more host connections between the host system with mastership and the namespace have timed out and that host system is no longer active or connected to the storage system.

At block 832, mastership may be migrated to another connected host system. For example, the storage system may select another host identifier associated with the namespace identifier to receive the mastership indicator and have master control of the namespace going forward, replacing the prior host system with mastership.

Figure 9:
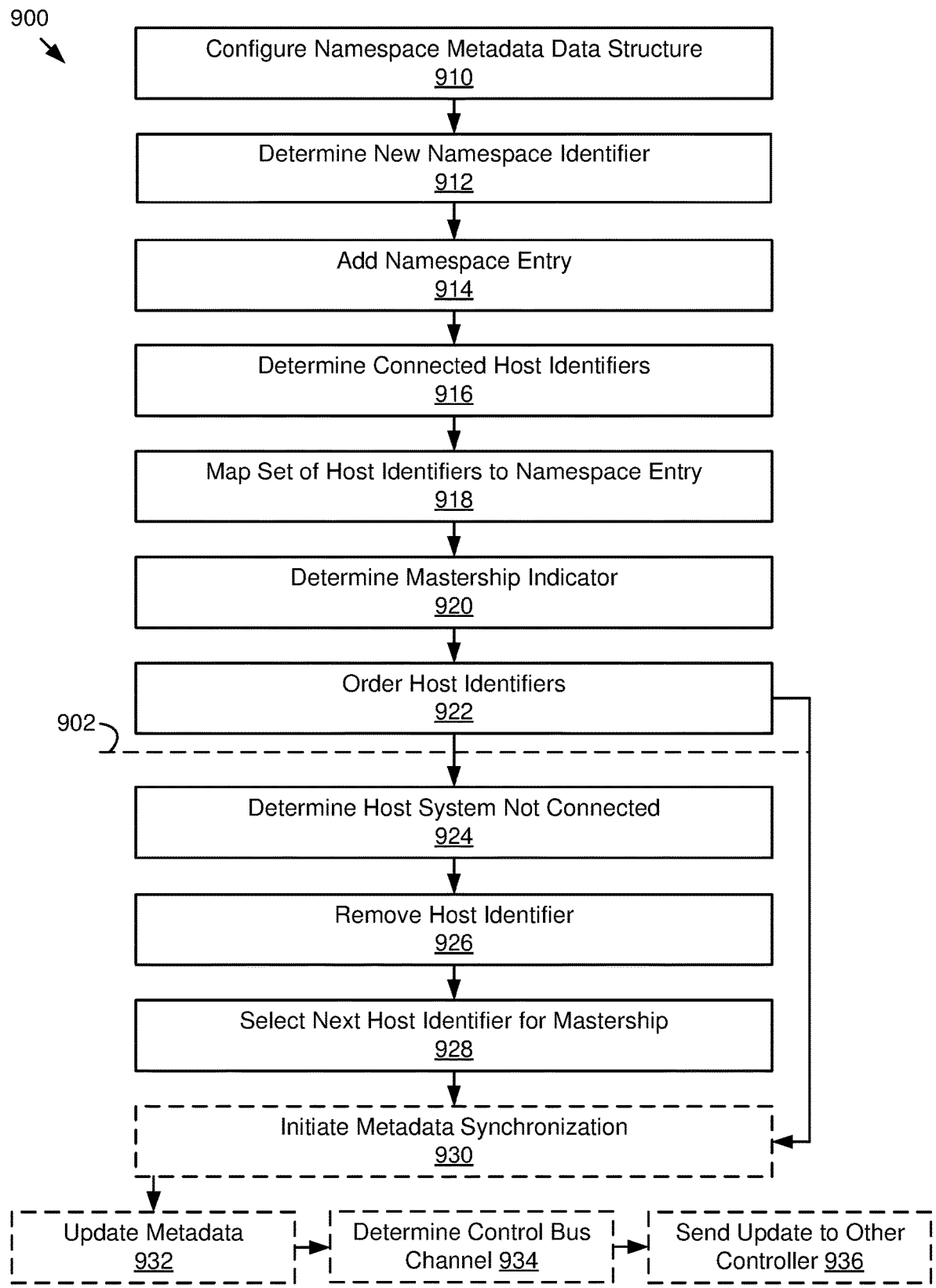
FIG. 9 is a flowchart of an example method of configuring and using a namespace metadata data structure to manage mastership.

As shown in FIG. 9, storage system 500 may be operated according to an example method for configuring and using a namespace metadata data structure to manage mastership, i.e., according to method 900 illustrated by blocks 910-936 in FIG. 9.

At block 910, a namespace metadata data structure may be configured. For example, the storage system may be configured with a namespace metadata table in non-volatile memory that includes namespace entries for the host identifier information for each namespace.

At block 912, a new namespace identifier may be determined. For example, the storage system may determine the namespace identifier for a new namespace in response to a connection request from a host system.

At block 914, a namespace entry may be added. For example, the storage system may add a namespace entry as a new row in the metadata table indexed by the namespace identifier determined at block 912.

At block 916, connected host identifiers may be determined. For example, the storage system may determine one or more host connections to the namespace and their corresponding host identifiers.

At block 918, a set of host identifiers may be mapped to a namespace entry. For example, the storage system may add host identifiers corresponding to each host connection determined at block 916 to a host identifier list in the namespace entry for the namespace identifier. These may be added over time starting with the host identifier that initially requested the namespace and then appending each additional host identifier for other hosts requesting connection to the same namespace.

At block 920, a mastership indicator may be determined. For example, the storage system may determine which of the connected host systems should have mastership and indicate mastership of that host identifier in the list of host identifiers by position, flag, or mastership indicator field.

At block 922, the host identifiers may be ordered. For example, the storage system may order the host identifiers in each namespace entry according to the order in which connections were initially requested by the corresponding host systems or the storage system may include logic for ordering or reordering the host identifiers based on another priority scheme. At line 902, operating time may pass for the storage system until one or more host system connections timeout.

At block 924, a host system may be determined to not be connected. For example, the storage system may determine that a host system is no longer connected to the storage system and/or target namespace based on detecting timeout conditions for one or more host connections.

At block 926, the host identifier may be removed from the namespace entry. For example, the storage system may, in response to the timeout conditions being met, remove the host identifier for the host system that has lost connection or otherwise become unresponsive from the host identifier list in the namespace entry for the previously connected namespace.

At block 928, the next host identifier may be selected for mastership. For example, if the host identifier removed at block 926 is the host identifier that previously had mastership, the storage system may migrate mastership to another connected host system by selecting the next host identifier in the host identifier list for the namespace.

In some embodiments, the namespace metadata data structure may need to be synchronized across multiple components in the storage system, such as multiple NVMeoF controllers. Following creation and/or updating of new namespace entries (at blocks 910-922) and/or changes due to removal of unresponsive host systems (at blocks 924-928), metadata may be synchronized across components at blocks 930-936. At block 930, responsive to changes, metadata synchronization may be initiated. For example, the storage system may determine metadata changes or other trigger conditions for synchronizing the namespace metadata data structure across components.

At block 932, metadata may be updated. For example, the storage system may determine a new namespace entry or changes to one or more fields in an existing namespace entry that need to be updated across copies of the namespace metadata.

At block 934, a control bus channel may be determined. For example, the storage system may be configured with one or more channels for directing messages and data content between the components over the control bus and a channel may be selected for sending the metadata update determined at block 932.

At block 934, the update may be sent to other controllers. For example, the NVMeoF controller that processed the changes to the metadata data structure may be configured for messaging one or more other NVMeoF controllers over the selected control bus channel and may generate and send corresponding messages with metadata updates in the payload.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

The invention claimed is:

1. A storage system, comprising:
a first storage interface controller comprising:
a host interface configured to receive host storage commands from a plurality of host systems;
a storage device interface configured to direct host storage commands to at least one namespace of a plurality of namespaces in at least one data storage device;
a memory configured to store a data structure configured to:
map, for each namespace of the plurality of namespaces, a namespace identifier for that namespace to a set of host identifiers for host systems connected to that namespace; and
order, for each namespace of the plurality of namespaces, the set of host identifiers for that namespace in an order in which corresponding host systems connected to that namespace; and
at least one processor configured to, alone or in combination:
determine, for the at least one namespace and based on the data structure, a set of host systems connected to the at least one namespace;
determine, for the set of host systems, a mastership indicator based on a position of the host identifier in the order of the set of host identifiers in the data structure for the at least one namespace; and
selectively process a namespace delete command responsive to a received host identifier corresponding to the namespace delete command matching the host identifier with the mastership indicator.

2. The storage system of claim 1, wherein the at least one processor is further configured to, alone or in combination:
selectively reject the namespace delete command responsive to the received host identifier corresponding to the namespace delete command being different than the host identifier with the mastership indicator.

3. The storage system of claim 1, wherein the data structure comprises, for each namespace of the plurality of namespaces:
the namespace identifier for that namespace;
the ordered set of host identifiers connected to that namespace; and
the mastership indicator for one host identifier in that set of host identifiers.

4. The storage system of claim 3, wherein:
each namespace of the plurality of namespaces corresponds to a namespace entry in the data structure indexed by the namespace identifier for that namespace; and
each namespace entry in the data structure includes the ordered set of host identifiers connected to that namespace.

5. The storage system of claim 4, wherein the at least one processor is further configured to, alone or in combination:
determine that a first host system corresponding to the mastership indicator is not connected to the host interface;
remove, responsive to determining that the first host system is not connected to the host interface, the host identifier for the first host system from the corresponding namespace entry; and
select a next host identifier in the order for the mastership indicator.

6. The storage system of claim 1, wherein the at least one processor is further configured to, alone or in combination:
receive, from a first host system of the plurality of host systems, a first connection request for a first namespace;
create, responsive to the first connection request, the first namespace by allocating a namespace in the at least one data storage device to a first namespace identifier for the first namespace;
connect the first host system to the first namespace; and
assign the mastership indicator for the first namespace to a first host identifier for the first host system.

7. The storage system of claim 6, wherein the at least one processor is further configured to, alone or in combination:
receive, subsequent to the first connection request and from a second host system of the plurality of host systems, a second connection request for the first namespace;
connect the second host system to the first namespace; and
associate a second host identifier for the second host system with the first namespace without the mastership indicator.

8. The storage system of claim 7, wherein the at least one processor is further configured to, alone or in combination:
determine a timeout condition for the first host system; and
migrate, responsive to the timeout condition for the first host system, the mastership indicator from the first host identifier to the second host identifier.

9. The storage system of claim 1, further comprising:
a second storage interface controller configured to:
communicate with the plurality of host systems to receive host storage commands for the at least one namespace;
communicate with the at least one data storage device to direct host storage commands for the at least one namespace; and
synchronize, with the first storage interface controller, a set of metadata indicating:
host identifiers connected to the at least one namespace; and
the mastership indicator.

10. The storage system of claim 9, wherein:
the first storage interface controller and the second storage interface controller are connected to a control bus; and
the at least one processor is further configured to, alone or in combination:
update the set of metadata; and
send the updated set of metadata to the second storage interface controller using a control bus protocol.

11. A computer-implemented method, comprising:
receiving, from a first host system of a plurality of host systems, a first connection request for a first namespace;
creating, responsive to the first connection request, the first namespace by allocating a namespace in at least one data storage device to a first namespace identifier for the first namespace;
connecting, through a host interface, the first host system to the first namespace;

assigning a mastership indicator for the first namespace to a first host identifier for the first host system;

determining, for the first namespace, a set of host systems connected to the first namespace;

determining, for the set of host systems, the mastership indicator based on the first host identifier; and selectively processing a namespace delete command responsive to a received host identifier corresponding to the namespace delete command matching the first host identifier with the mastership indicator.

12. The computer-implemented method of claim 11, further comprising:

mapping, in a data structure, namespace identifiers for a plurality of namespaces to host identifiers for host systems connected to each namespace of the plurality of namespaces, wherein:
the plurality of namespaces includes the first namespace; and
the data structure comprises, for each namespace:
a namespace identifier for that namespace;
a set of host identifiers connected to that namespace; and
a mastership indicator for one host identifier in that set of host identifiers.

13. The computer-implemented method of claim 12, further comprising:

ordering, in the data structure, the set of host identifiers in each namespace entry in an order in which corresponding host systems connected to that namespace, wherein:
each namespace of the plurality of namespaces corresponds to a namespace entry indexed by the namespace identifier for that namespace; and
a position in the order is the mastership indicator.

14. The computer-implemented method of claim 13, further comprising:

determining that the first host system corresponding to the mastership indicator is not connected to the host interface;

removing, responsive to determining that the first host system is not connected to the host interface, the first host identifier for the first host system from the corresponding namespace entry; and selecting a next host identifier in the order for the mastership indicator.

15. The computer-implemented method of claim 11, further comprising:

selectively rejecting the namespace delete command responsive to the received host identifier corresponding to the namespace delete command being different than the first host identifier with the mastership indicator.

16. The computer-implemented method of claim 11, further comprising:

receiving, subsequent to the first connection request and from a second host system of the plurality of host systems, a second connection request for the first namespace;

connecting the second host system to the first namespace; and associating a second host identifier for the second host system with the first namespace without the mastership indicator.

17. The computer-implemented method of claim 16, further comprising:

determining a timeout condition for the first host system; and migrating, responsive to the timeout condition for the first host system, the mastership indicator from the first host identifier to the second host identifier.

18. The computer-implemented method of claim 11, further comprising:

synchronizing, between a first storage interface controller and a second storage interface controller, a set of metadata, wherein:
the set of metadata indicates:
host identifiers connected to the first namespace; and
the mastership indicator; and
the first storage interface controller and the second storage interface controller are configured to:
communicate with a plurality of host devices to receive host storage commands for the first namespace;
communicate with the at least one data storage device to direct host storage commands for the first namespace; and
use the set of metadata to compare the received host identifier corresponding to the namespace delete command to the first host identifier with the mastership indicator.

19. The computer-implemented method of claim 18, further comprising:

updating, by the first storage interface controller and responsive to a connection request from a host system, the set of metadata; and sending the updated set of metadata to the second storage interface controller using a control bus protocol, wherein the first storage interface controller and the second storage interface controller are connected to a control bus.

20. A storage system comprising:

a processor;

a memory;

a host interface configured to receive host storage commands from a plurality of host systems;

a storage device interface configured to direct host storage commands to at least one namespace in at least one data storage device;

means for receiving, from a first host system of a plurality of host systems, a first connection request for a first namespace;

means for creating, responsive to the first connection request, the first namespace by allocating a namespace in at least one data storage device to a first namespace identifier for the first namespace;

means for connecting the first host system to the first namespace;

means for assigning a mastership indicator for the first namespace to a first host identifier for the first host system;

means for determining, for the first namespace, a set of host systems connected to the first namespace;

means for determining, for the set of host systems, the mastership indicator based on the first host identifier;

means for selectively processing a namespace delete command responsive to a received host identifier corresponding to the namespace delete command matching the first host identifier with the mastership indicator; and means for selectively rejecting the namespace delete command responsive to the received host identifier corresponding to the namespace delete command being different than the first host identifier with the mastership indicator.

\* \* \* \* \*